US009014055B2

(12) United States Patent
Deprun et al.

(10) Patent No.: US 9,014,055 B2
(45) Date of Patent: Apr. 21, 2015

(54) METHOD FOR COMMUNICATING WITH OTHER DEVICES, AND COMMUNICATION DEVICE

(75) Inventors: Jean-Francois Deprun, Paris (FR); Younsung Chu, Gyeonggi-do (KR); Jihye Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 13/702,400

(22) PCT Filed: Jun. 8, 2011

(86) PCT No.: PCT/KR2011/004171
§ 371 (c)(1),
(2), (4) Date: Dec. 6, 2012

(87) PCT Pub. No.: WO2011/155760
PCT Pub. Date: Dec. 15, 2011

(65) Prior Publication Data
US 2013/0077532 A1  Mar. 28, 2013

Related U.S. Application Data

(60) Provisional application No. 61/352,800, filed on Jun. 8, 2010, provisional application No. 61/353,182, filed on Jun. 9, 2010, provisional application No. 61/356,644, filed on Jun. 20, 2010, provisional application No. 61/386,954, filed on Sep. 27, 2010, provisional application No. 61/419,877, filed on Dec. 6, 2010.

(51) Int. Cl.
*H04W 84/18* (2009.01)
*H04W 4/00* (2009.01)
*H04W 76/00* (2009.01)

(52) U.S. Cl.
CPC .............. *H04W 4/008* (2013.01); *H04W 76/00* (2013.01); *H04W 84/18* (2013.01)

(58) Field of Classification Search
CPC ....... H04W 4/008; H04W 4/02; H04W 76/00; H04W 84/18; H04W 84/12; H04W 64/00; H04W 92/02; H04L 67/1008; H04L 67/1034; H04L 67/1029; H04L 67/1002; H04L 67/125; H04L 69/40; H04L 12/4625
USPC ......................................... 370/255, 328, 338
See application file for complete search history.

(56) References Cited

U.S. PATENT DOCUMENTS 8,631,107 B2 * 1/2014 Mohri et al. .................. 709/223
2004/0068584 A1 * 4/2004 Costa-Requena et al. .... 709/246

(Continued)

FOREIGN PATENT DOCUMENTS

| KR | 10-2010-0050620 A | 5/2010 |
|---|---|---|
| KR | 10-2010-0051887 A | 5/2010 |
| KR | 10-2010-0053714 A | 5/2010 |

OTHER PUBLICATIONS

Search Report issued in corresponding International Application No. PCT/KR2011/004171 dated Jan. 19, 2012.

*Primary Examiner* — Andrew Chriss
*Assistant Examiner* — Rasha Fayed
(74) *Attorney, Agent, or Firm* — Morgan, Lewis & Bockius LLP

(57) ABSTRACT

One embodiment of the present invention relates to a method for communicating with other devices, performed by a communication device comprising a converged personal network service (CPNS) enabled entity. The communication method comprises a step in which the CPNS enabled entity operates in a personal network entity (PNE) mode to establish a connection to a first device, wherein the first device is established as a gateway and thus manages a first network. The communication method further comprises a step of activating a bridge function in cases where the communication device has moved into the coverage of a second network managed by a second device.

15 Claims, 14 Drawing Sheets

(56) References Cited

U.S. PATENT DOCUMENTS

| | | | |
|---|---|---|---|
| 2007/0274327 A1* | 11/2007 | Kaarela et al. | 370/401 |
| 2008/0192684 A1* | 8/2008 | Tervonen | 370/329 |
| 2010/0284390 A1 | 11/2010 | Lee et al. | |
| 2010/0293183 A1* | 11/2010 | Yaqub | 707/769 |
| 2010/0313225 A1* | 12/2010 | Cholas et al. | 725/62 |

* cited by examiner

METHOD FOR COMMUNICATING WITH OTHER DEVICES, AND COMMUNICATION DEVICE

TECHNICAL FIELD

The present invention relates to Converged Personal Network Service (CPNS).

BACKGROUND ART

Among a variety of developed technologies, conventional technologies such as Digital Living Network Alliance (DLNA) or ZigBee focus on mutually searching for and using services of devices within a specific Personal Area Network (PAN), while tethering focuses on connections between heterogeneous networks.

Compared to the simple PAN, the concept of CPNS has been proposed.

The CPNS allows access to services from devices belonging to a Personal Network (PN) or PAN.

The CPNS is implemented through a CPNS server, a CPNS GateWay (GW), and CPNS-supporting devices. Besides, general servers and general devices may exist for the CPNS.

The CPNS is based on a PN. A group of devices form a PN, a CPNS GW is placed in the PN, and services of the devices belonging to the PN are registered to the CPNS server. Then a device that provides a specific service can be searched for in the CPNS server so that an external entity may share the service from the device.

The CPNS GW (also called PN GW) functions to connect the PN to another network. A CPNS device is also called a Personal Network Entity (PNE) which is a member of the PN. A group of devices may form a PNE or a single device may be a PNE.

FIG. 1 is an exemplary view illustrating the concept of the CPNS.

General servers, CPNS servers, CPNS GWs, CPNS devices, and general devices are shown in FIG. 1.

A CPNS server may communicate with one or more CPNS GWs (i.e. PN GWs) and thus may transmit data to or receive data from the CPNS GWs. Each CPNS server may exchange data with one or more CPNS devices within a PN (or PAN) by communicating with them.

Each of the CPNS devices may transmit data to or receive data from one or more other CPNS devices or general devices through a CPNS GW.

The CPNS GW may transmit data to or receive data from a CPNS server within the same or a different PN, or CPNS devices by communicating with the CPNS server or the CPNS devices.

Each CPNS server may transmit data to or receive data from a general server and a CPNS GW by communicating with them.

For example, the CPNS GW may communicate with the CPNS server over a cellular network and with a CPNS device by short-range communication, for example, by Bluetooth, Near Field Communication (NFC), ZigBee, Wireless Fidelity (WiFi), etc.

The CPNS server can improve user experience by managing and controlling communication between the CPNS GW and the CPNS device and thus allowing exchange of applications and information between the CPNS GW and the CPNS device. For example, a user may acquire position information from another CPNS device (e.g. a Global Positioning System (GPS) device) through one CPNS device, transmit the position information to the CPNS server through the CPNS GW, and receive a location-based service from the CPNS server.

As a consequence, the user can receive various services through a plurality of CPNS devices within the PN.

DISCLOSURE

Technical Problem

The above-described conventional technology has not provided a technical specification required to implement the CPNS, simply introducing the concept of the CPNS.

Accordingly, an object of the present invention devised to solve the conventional problem is to provide a specific technology for implementing the CPNS.

Technical Solution

In an aspect of the present invention, a method for communicating with another device at a communication device having a Converged Personal Network Service (CPNS)-enabled entity comprises establishing a connection with a first device by the CPNS-enabled entity of the communication device operating in Personal Network Entity (PNE) mode. The first device is configured as a gateway and manages a first network. The communication method further comprises receiving a bridge request message by the CPNS-enabled entity of the communication device, if the communication device moves into a coverage of a second network managed by a second device. The bridge request message is generated based on a comparison between information about the first network received from the first device and information about devices detected during a discovery procedure between the communication device and the second device. The communication method further comprises transmitting a bridge request message to the first device in response to the received bridge request message, receiving a bridge response message including a value indicating allowance or denial from the first device, and activating a bridge function based on the value included in the bridge response message. If the first device cannot communicate with the second device and there is an entity in the first network that should receive a service from the second network, the bridge response message includes a value indicating allowance.

The method may further include transmitting the bridge response message including a value indicating allowance or denial to the second device.

If the first device receives an acknowledgement from a user, the bridge response message may include a value indicating allowance.

Communication links may be established among the communication device of the first network, the first device, and the second device of the second network, by the bridge activation.

The method may further include establishing a physical connection with the second device after the communication device moves into the coverage of the second network managed by the second device, and performing a discovery procedure with the second device after the physical connection is established.

During the discovery procedure, a message including information about the first network may be transmitted to the second device.

The comparison may be performed by the second device or a CPNS server.

In another aspect of the present invention, a method for communicating with another device at a communication device having a CPNS-enabled entity is provided.

The communication method comprises establishing a first network with a first device operating as a PNE by the CPNS-enabled entity of the communication device operating in gateway mode. The CPNS-enabled entity of the communication device manages the first network and the first network includes one or more PNEs capable of receiving a first service through the CPNS-enabled entity configured as a gateway. The communication method further comprises receiving a bridge request message from the first device. The bridge request message is generated by a second device when the first device moves into a coverage of a second network managed by the second device. The communication method further comprises transmitting a bridge response message including a value indicating allowance to the first device to activate the first device as a bridge, if the first device cannot communicate with the second device and there is an entity in the first network that should receive a service from the second network. Communication links are established among the communication device, the first device, and the second device due to the bridge activation. Communication links may be established among the communication device, the first device, and the second device by the bridge activation.

In a further aspect of the present invention, a communication device comprises a storage for storing a CPNS-enabled entity set to PNE mode and a transceiver for, when the communication device moves into a coverage of a second network managed by a second device, while being connected to a first device having a CPNS-enabled entity configured as a gateway, upon receipt of a bridge request message from the second device, transmitting the bridge request message to the first device and receiving a bridge response message including a value indicating allowance or denial from the first device. The first device manages the first network and the first network includes one or more PNEs capable of receiving a first service through the first device. The communication device further comprises a controller for activating a bridge function based on the value included in the bridge response message. The bridge function may allow communication between the first and second networks. If the first device cannot communicate with the second device and there is an entity in the first network that should receive a service from the second network, the bridge response message may include a value indicating allowance.

The transceiver may transmit a bridge response message including a value indicating allowance or denial to the second device. If the first device receives an acknowledgement from a user, the bridge response message includes a value indicating allowance.

After the communication device moves into the coverage of the second network managed by the second device, the transceiver may establish a physical connection with the second device and the perform a discovery procedure with the second device. The transceiver may transmit a message including information about the first network to the second device during the discovery procedure.

Advantageous Effects

The embodiments of the present invention solve the afore-described conventional problem. That is, the embodiments of the present invention provide a specific technology for implementing the CPNS.

BEST MODE FOR CARRYING OUT THE INVENTION

Figure 1:
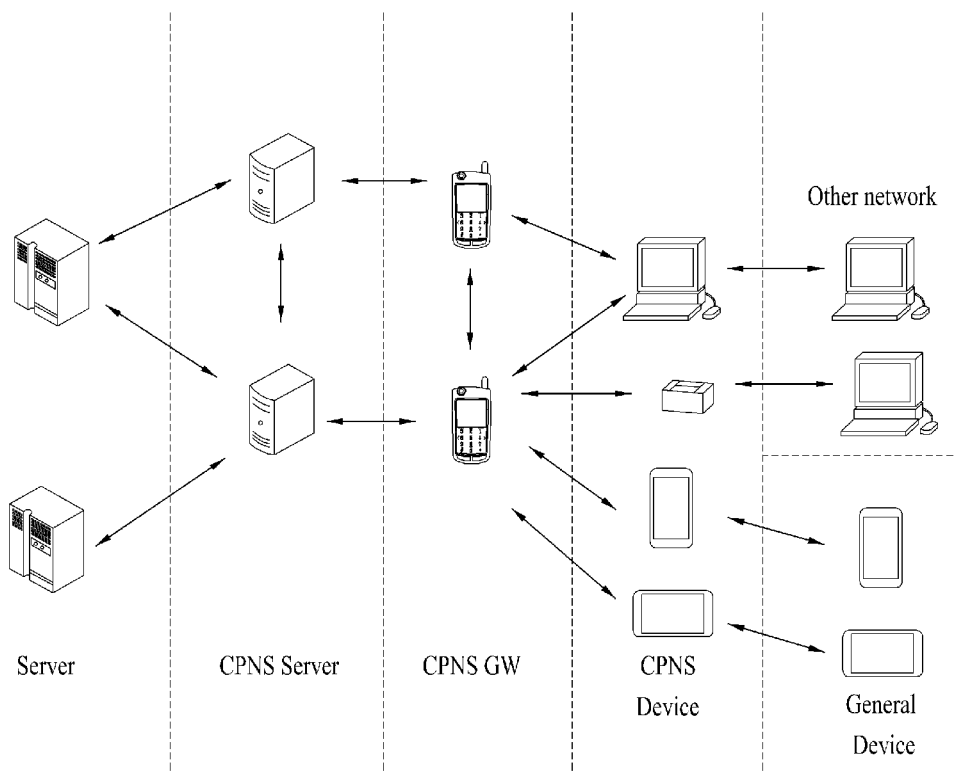
FIG. 1 is an exemplary view illustrating the concept of Converged Personal Network Service (CPNS)

The present invention relates to Converged Personal Network Service (CPNS), which should not be construed as limiting the present invention. Rather, the present invention can be used for all communication systems and methods to which the technical spirit of the present invention is applicable, and other systems.

The technical terms used in the present invention are provided simply to describe specific embodiments, not intended to restrict the present invention. Unless otherwise defined, all the terms used herein including technical or scientific terms have the same meaning as terms generally understood by those skilled in the art. The terms should be interpreted as neither excessively comprehensive meanings nor excessively narrow meanings. If technical terms used in the specification are wrongly chosen to accurately express the subject matter of the present invention, they should be construed as the terms readily understood to those skilled in the art. In addition, general terms used in the present invention should be understood as defined in a general dictionary or should be construed by contextual meanings, but should not be interpreted as excessively comprehensive or narrow meanings.

Herein, singular expressions include plural expressions unless otherwise clarified in the context. In this description, the term "include" or "have" is not interpreted as necessarily including all of the components or steps described in the specification. Rather, it should be understood that there are possibilities of omitting or adding one or more components or steps.

While ordinal numbers like first, second, etc. can be used to describe a number of components, these components are not limited by the terms. The terms are used to distinguish one component from other components. For example, a first component may be referred to as a second component or vice versa within the scope and spirit of the present invention.

When it is said that one component is "connected" or "linked" to another component, they may be connected or linked directly or with a third component in between. On the other hand, if it is clarified that one component is "directly connected" or "directly linked" to another component, it should be understood that a third component is not interposed between the components.

Reference will now be made to preferred embodiments of the present invention with reference to the attached drawings. Like reference numerals denote the same or similar components and redundant descriptions are avoided. A detailed description of known technologies will be omitted lest it should obscure the subject matter of the present invention. In addition, the attached drawings are provided to help easy understanding of the subject matter of the present invention, not limiting the present invention. The spirit of the present invention should be interpreted as expanding to all variations, equivalents, and replacements besides the attached drawings.

The term "terminal" is used in the drawings, but this term may be replaced with User Equipment (UE), Mobile Equipment (ME), User Terminal (UT), Subscriber Station (SS), wireless device, handheld device, Access Terminal (AT), etc. The terminal may be a portable device having a communication function such as a portable phone, a Personal Digital Assistant (PDA), a smart phone, a wireless modem, or a laptop computer, or a non-portable device such as a PC or an in-vehicle device.

DEFINITIONS OF TERMS

With reference to the drawings, terms used in the present invention will be defined in brief to help understanding of the present invention.

1) CPNS: CPNS allows access to services from devices that form a Personal Network (PN) (or Personal Area Network (PAN)). Compared to tethering that allows an Internet-connected device to assign a private Internet Protocol (IP) address to another device by Network Address Translation (NAT) so that the device may access the Internet using the private IP, the CPNS allows a first device of a user to integrally manage various services that can be provided over a mobile communication network, beyond simple allocation of a private IP address to another device. Since the first device of the user manages services in an integrated manner, services can be shared seamlessly among a plurality of devices of the user. For example, while the first device uses on-going Video on Demand (VoD) file, the first device may transfer an on-going VoD file seamlessly to a second device, thereby increasing user convenience. In addition, in the case where the user has a plurality of devices, when an external server is to transmit service data to the user without a request of the user, the external server may select a device to receive the service data from among the plurality of devices. For example, if the user has a plurality of devices capable of conducting a video call, upon the user receiving a video call request, a device to receive a video call may be determined from among the plurality of devices. The on-going video call may also be transferred to another device of the user. This CPNS is implemented by a CPNS-enabled entity provided at a device of the user.

2) CPNS-enabled entity: A CPNS-enabled entity is a logical entity and there are three types of CPNS-enabled entities: Personal Network Entity (PNE), Personal Network GateWay (PN GW), and CPNS server. The CPNS server is located within a core network and the PNE and PN GW are located within a CPNS device.

3) CPNS device: A CPNS device is a device that can operate simultaneously in a plurality of modes in a PN. The CPNS is equipped with a function of processing, storing, and reproducing content. In addition, the CPNS device may have communication interfaces so that different CPNS devices may operate in different modes in a PN.

4) CPNS server: A CPNS server is a functional entity that can provide resources to CPNS entities in response to a request or in a push fashion. The CPNS server registers services related to devices and a user, stores corresponding information, and provides registration of a PN being a group of devices and registration of a service group including a PN and a Wireless Access Network (WAN). The CPNS server may also communicate with external entities such as a content server. The CPNS server is an entity that sets a key for authenticating a device of the user in order to implement a service on a CPNS framework. In addition, the CPNS server registers external services and supports a search and consumption/provision request, for consumption at a device.

5) PN (Personal Network): A PN is a set of devices that enable a user to consume or generate services. All devices of the PN may be connected to a PN GW. The PN may change with the passage of time. The PN may include at least a device operating in GW mode and another device operating as a PNE.

6) PNE (Personal Network Element): A PNE is a member of a PN. The PNE may consume or provide a service or content. The PNE is an entity that actually consumes content, applications, and services. In addition, the PNE is a member of a PN or a service group that are created in the CPNS framework.

7) PN GW (Person Network Gateway): PN GW is an abbreviation for Personal Network Gateway. A PN GW is an entity that is located in a PN and a WAN and can form a PN for providing the CPNS. The PN GW resides in the PN and takes charge of connectivity between heterogeneous networks, for a device for which an external connection is impossible. The PN GW manages an inventory and registration of a CPNS server for the connected devices.

A PN GW in a device allows other devices as well as a PNE located in a PN to be connected to a CPNS server. The PN GW of the device uses a global network such as a mobile network. The PN GW also manages services with PNEs and manages communication and other functional information.

8) PN Inventory: A PN inventory is a list of PNs and devices belonging to a PN or PNs.

9) Service Group: A service group is a set of PNEs and PN GWs that share services, data, and applications. That is, the service group is a set of devices registered to a server through a created PN. Devices being the members of the service group are not necessarily dependent on one PN and may not belong to the same user. Rather, the service group may include all devices that are distributed in different PNs and thus cannot be connected to one another.

10) Zone: A zone is a specific geographical area.

11) Zoned based service: A zone based service means a CPNS provided within the zone-based coverage of a PN GW.

13) Zone PN GW: A PN GW that provides a unique service or content within a zone.

14) CPNS-enabled entity mode: A CPNS device may operate in PN GW or PNE modes. The modes may be identified between devices by a CPNS entity discovery function. A PN should include at least a device operating as a PN GW and a device operating as a PNE. Each of the PNE and the PN GW should know the other's mode in order to form a PN or join a PN. The PN GW should be able to identify the PNE to create a PN member. The PNE should identify the PN GW to form a new PN or join an existing PN.

A device supporting the PNE mode only (e.g. an MP3 player or a smart meter) operates only in the PNE mode. If a device can operate only as a PN GW, the device operates as a PN GW. However, when a device can operate as one of a PN GW and a PNE, the device may operate in one of the two modes according to a pre-stored setting value and the mode may be changed by a user setting or a service provider setting.

Figure 2:
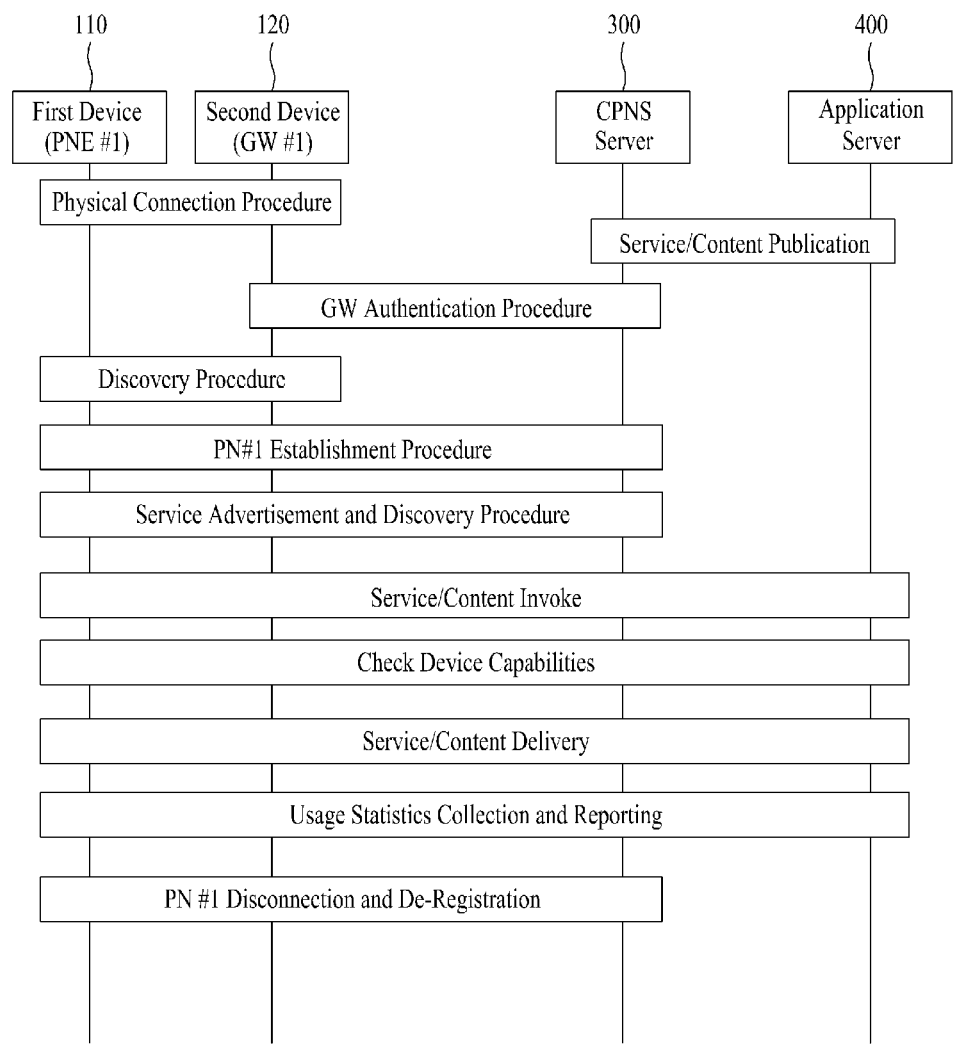
FIG. 2 is an exemplary view illustrating an overall CPNS procedure.

FIG. 2 is an exemplary view illustrating an overall CPNS procedure.

Referring to FIG. 2, a first device 110, a second device 120, a CPNS server 300, and an application server 400 are shown in FIG. 2.

User A owns the first device 110 and the second device 120. The first device 110 is a cellular phone of User A that may have a first transceiver to connect to the CPNS server 300 through a mobile communication network. To form a PN, the first device 110 may further include a second transceiver that may operate in conformance to, for example, Bluetooth, Wireless Fidelity (WiFi), or ZigBee. The second device 120 is a portable multimedia device of User A which has only a second transceiver operating in conformance to, for example, Bluetooth, WiFi, or ZigBee to form a PN, without a first transceiver used for communicating with the mobile communication network.

The first and second devices 110 and 120 may have CPNS-enabled entities. Each CPNS-enabled entity may operate in the PN GW mode or PNE mode. As an example, the second device 120 is shown in FIG. 2 as operating as a GW because it has the first transceiver connectable to the mobile communication network.

If the first and second devices 110 and 120 are close to each other, they perform a physical connection procedure through the second transceivers. Meanwhile, the application server 400 registers services and content to the CPNS server 300 or advertises the services and content. The CPNS server 300 authenticates the second device 120 operating as a GW.

Upon completion of the physical connection procedure between the first and second devices 110 and 120, each CPNS-enabled entity discovers the other CPNS-enabled entity.

Upon completion of the discovery, the devices establish PN #1. Information about PN #1 is registered to the CPNS server 300.

When PN #1 is completely established, the CPNS server 300 advertises its preserved services to the devices of PN #1 or searches for services available from the devices of PN #1.

If a device of PN #1 invokes a service or content from among the advertised services, the capabilities of the device are checked and a service or content is provided to the device according to the checked capabilities.

When the device uses the service or content, the use statistics of the service or content are collected and reported to the CPNS server 300 or the application server 400.

If PN #1 is not needed any longer, PN #1 may be released and the information about PN #1 may be de-registered from the CPNS server 300.

Figure 3:
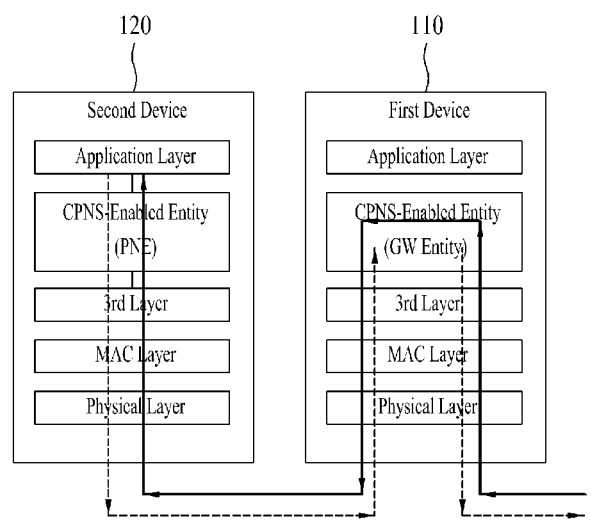
FIG. 3 illustrates the architecture of first and second devices illustrated in FIG. 2.

FIG. 3 illustrates the architecture of the first and second devices illustrated in FIG. 2.

Referring to FIG. 3, there are a physical layer, a Medium Access Control (MAC) layer, a $3^{rd}$ layer, a CPNS-enabled entity, and an application layer in each of the first and second devices 110 and 120. The CPNS-enabled entity of the second device 120 operates in the PNE mode and the CPNS-enabled entity of the first device 110 operates only a GW entity. On the other hand, the CPNS-enabled entity of the first device 110 operates a GW entity.

Accordingly, as indicated by a bold solid line in FIG. 3, service data is delivered to the GW entity of the CPNS-enabled entity through the physical layer, the MAC layer, and the third layer in the first device 110. Upon receipt of the service data, the GW entity of the first device 110 transmits the service data to the second device 120 through the CPNS-enabled entity, the $3^{rd}$ layer, the MAC layer, and the physical layer.

The PNE of the CPNS-enabled entity receives the service data through the physical layer, the MAC layer, and the $3^{rd}$ layer in the second device 120.

Meanwhile, the PNE of the CPNS-enabled entity in the second device 120 transmits a control message such as a request message or a response message to the first device 110 through the $3^{rd}$ layer, the MAC layer, and the physical layer.

Figure 4:
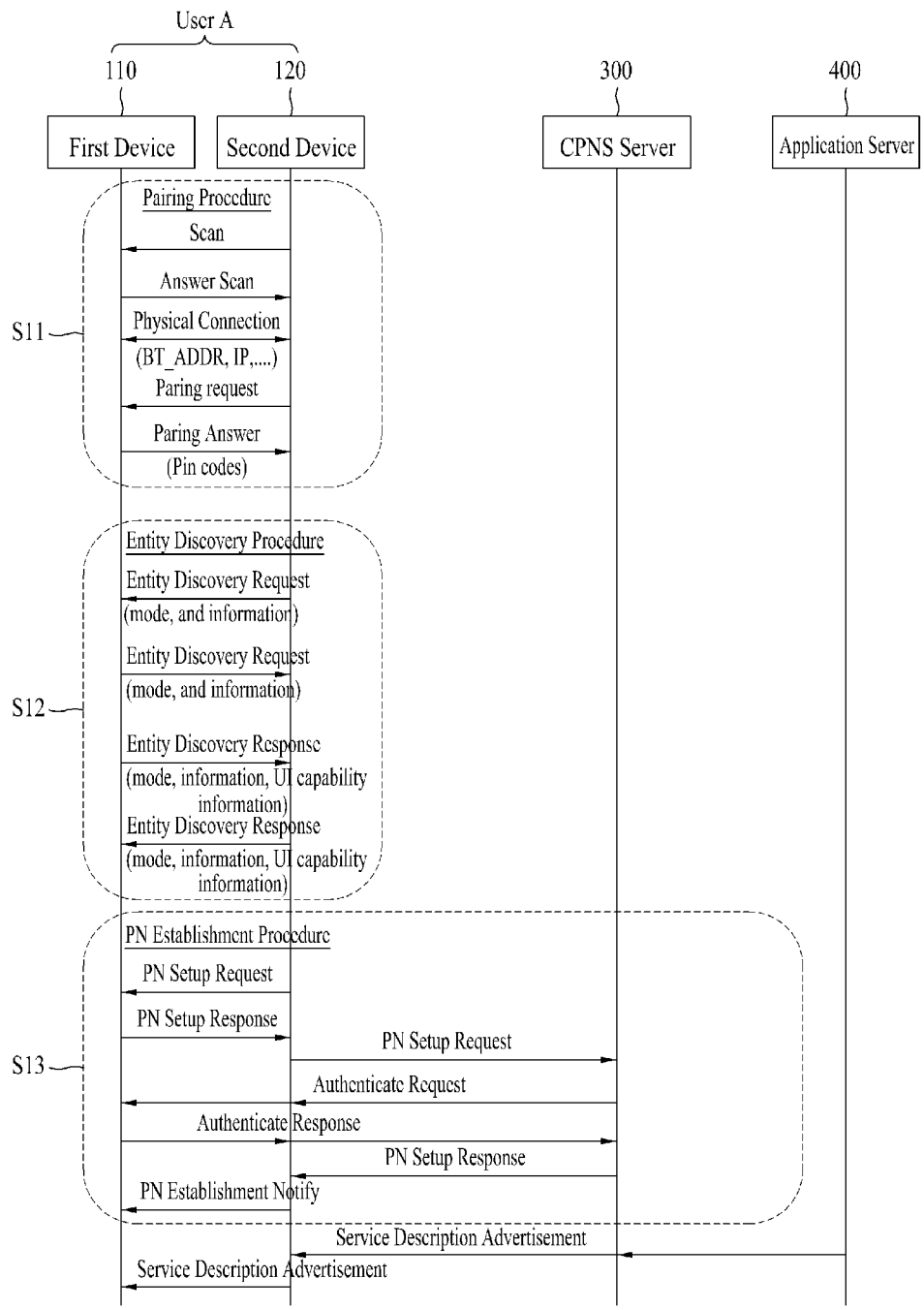
FIG. 4 is an exemplary view illustrating a CPNS initialization procedure.

FIG. 4 is an exemplary view illustrating a CPNS initial procedure.

Referring to FIG. 4, a pairing procedure corresponding to a physical connection procedure (S11), an entity discovery procedure (S12), and a PN establishment procedure (S13) are performed.

In the pairing procedure (S11), with no connection established between devices of User A, the physical connection procedure is initiated between the devices.

To this end, the second device 120 starts to scan. In order to scan, the second device 120 may transmit a Scan message to the first device 110. The first device 110 may reply to the second device 120 with an Answer Scan message. Then the physical connection procedure is initiated between the first and second devices 110 and 120 and information for the physical connection, e.g. addresses or IP addresses, is exchanged between the first device 110 and the second device 120. After the information is exchanged, the second device 120 transmits a physical connection request message, e.g. a Pairing Request message, to the first device 110. The first device 110 receives a Personal Identification Number (PIN) code from the user and transmits the PIN code in a connection request response message, e.g. a Pairing Answer message, to the second device 120. If the PIN code is correct, the physical connection procedure is completed.

Upon completion of the physical connection procedure, the CPNS-enabled entity within each device performs a procedure to discover the other, that is, the entity discovery procedure (S12).

Specifically, the CPNS-enabled entity of the second device 120 transmits a discovery request message, e.g. an Entity Discovery Request message, to the first device 110. The discovery request message, e.g. the Entity Discovery Request message, includes information about the mode of the CPNS-enabled entity within the second device 120 and information about the CPNS-enabled entity and already discovered other devices. If the CPNS-enabled entity of the second device 120 is configured as a gateway, the mode information may include information indicating that the CPNS-enabled entity of the second device 120 is configured as a gateway.

The CPNS-enabled entity of the first device 110 also transmits the discovery request message, e.g. the Entity Discovery Request message, to the second device 120. The discovery request message, e.g. the Entity Discovery Request message, includes information about the mode of the CPNS-enabled entity within the first device 110, information about the CPNS-enabled entity and already discovered other devices. If the CPNS-enabled entity of the first device 110 is configured as a personal network entity (PNE), the mode information may include information indicating that the CPNS-enabled entity of the first device 110 is configured as a PNE.

The CPNS-enabled entity of the first device 110 transmits a discovery response message, e.g. an Entity Discovery Response message, to the second device 120 in response to receiving the discovery request message. The discovery response message, e.g. the Entity Discovery Response message, includes the mode information, the information about the CPNS-enabled entity and the already discovered other devices, and information about UI functions.

Likewise, the CPNS-enabled entity of the second device 120 also transmits a discovery response message, e.g. an Entity Discovery Response message, to the first device 110 in response to the discovery request message.

When the discovery procedure is completed by exchanging the above messages between the first and second devices 110 and 120, the PN establishment procedure (S13) is performed.

Specifically, if the CPNS-enabled entity of the second device 120 is configured as a gateway, the second device 120 transmits a PN setup request message, e.g. a PN Setup Request message, to a device configured as a PNE, e.g. the first device 110. The PN setup request message may include information about the gateway and information about entities (e.g. the CPNS-enabled entity within the first device) that will belong to the PN to be created.

When the CPNS-enabled entity of the first device 110 transmits a PN setup response message, e.g. a PN Setup Response message, to the second device, the CPNS-enabled entity of the second device 120 transmits a PN setup request message to the CPNS server 300.

Upon receipt of the PN setup request message, the CPNS server 300 transmits an authentication request message, e.g. an Authenticate Request message, to the first device 110 through the second device 120 operating as the gateway. The first device 110 transmits an authentication response message, e.g. an Authenticate Response message, to the CPNS server 300 through the second device 120 in response to the authenticate request message.

Upon receipt of the authenticate response message, the CPNS server 300 transmits a PN setup response message to the second device 120 operating as the gateway.

Then the CPNS-enabled entity of the second device 120 operating as the gateway transmits a PN setup completion notification message, e.g. a PN Establishment Notify message, to the first device 110.

When the PN establishment is completed by exchanging the above-described messages, the application server 400 such as a content server may transmit a Service Description Advertisement message including information about its services to the second device 120 operating as the GW through the CPNS server 300. Then the second device 120, which is the GW, transmits the Service Description Advertisement message to the devices of the PN managed by the second device 120.

Figure 5:
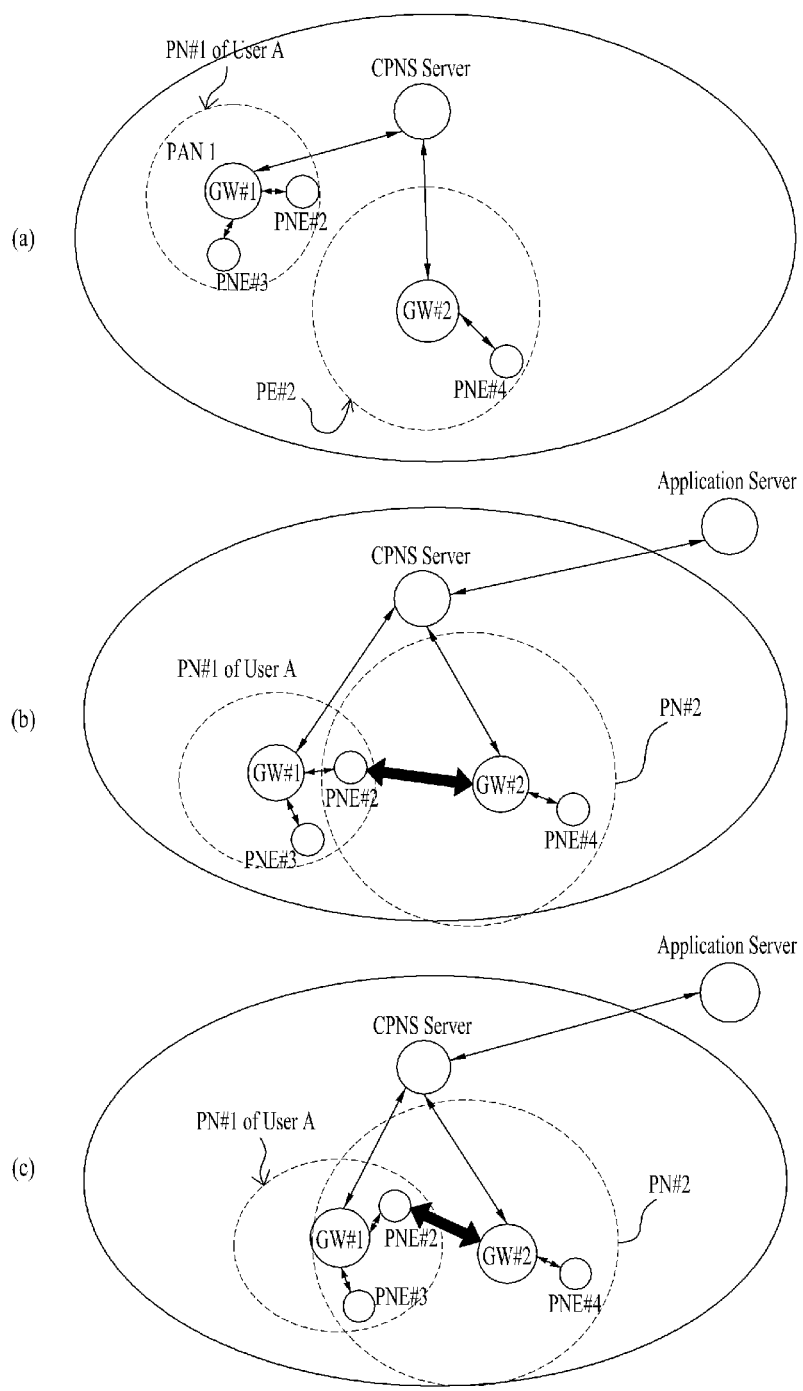
FIG. 5 illustrates examples in which the Personal Network (PN) of User A overlaps with another PN due to geographical movement of User A.

FIG. 5 illustrates examples in which the PN of User A overlaps with another PN due to geographical movement of User A.

In FIG. 5(*a*), two PNs, a CPNS server, and an application server are illustrated as an example. PN #1 of the two PNs was created by User A. PN #1 may include devices of User A, e.g. GW #1, PNE #2, and PNE #3, as illustrated in FIG. 5(*a*). It is assumed that GW #1 is a cellular phone of User A and PNE #2 and PNE #3 are portable multimedia devices of User A. Meanwhile, PN #2 of the two PNs includes GW #2 and PNE #4. The application server may provide a service to the PNEs within each PN through the CPNS server and GWs #1, #2.

Referring to FIG. 5(*b*), it is assumed that User A leaves GW #1 in a car and geographically moves into the coverage of PN #2, carrying PNE #2 and PNE #3. It is also assumed that PNE #3 operates in a communication scheme that cannot communicate with GW #2, different from those of PNE #2 and GW #2.

Even though User A wants to receive a service from PN #2 through PNE #3 in this situation, User cannot receive the service because PNE #3 cannot communicate with GW #2.

To solve this problem, PNE #2 should receive the service by communicating with GW #2 and deliver the service to PNE #3. That is, PNE #2 should operate as a bridge.

Referring to FIG. 5(*c*), it is assumed that User A geographically moves into the coverage of PN #2, carrying GW #1, PNE #2, and PNE #3.

If User A wants to receive a service from PN #2 through PNE #3 in this situation, PNE #2 may operate as a bridge, thereby receiving the service from GW #2 and delivering the service to PNE #3. Alternatively, PNE3 #3 may operate as a bridge, thereby receiving the service from GW #2. As such, in the case where two or more PNEs can operate as bridges in this manner, the issue may arise as to which PNE to be selected.

Accordingly, a method for operating a device as a bridge and a method for selecting a bridge will be described below.

Figure 6:
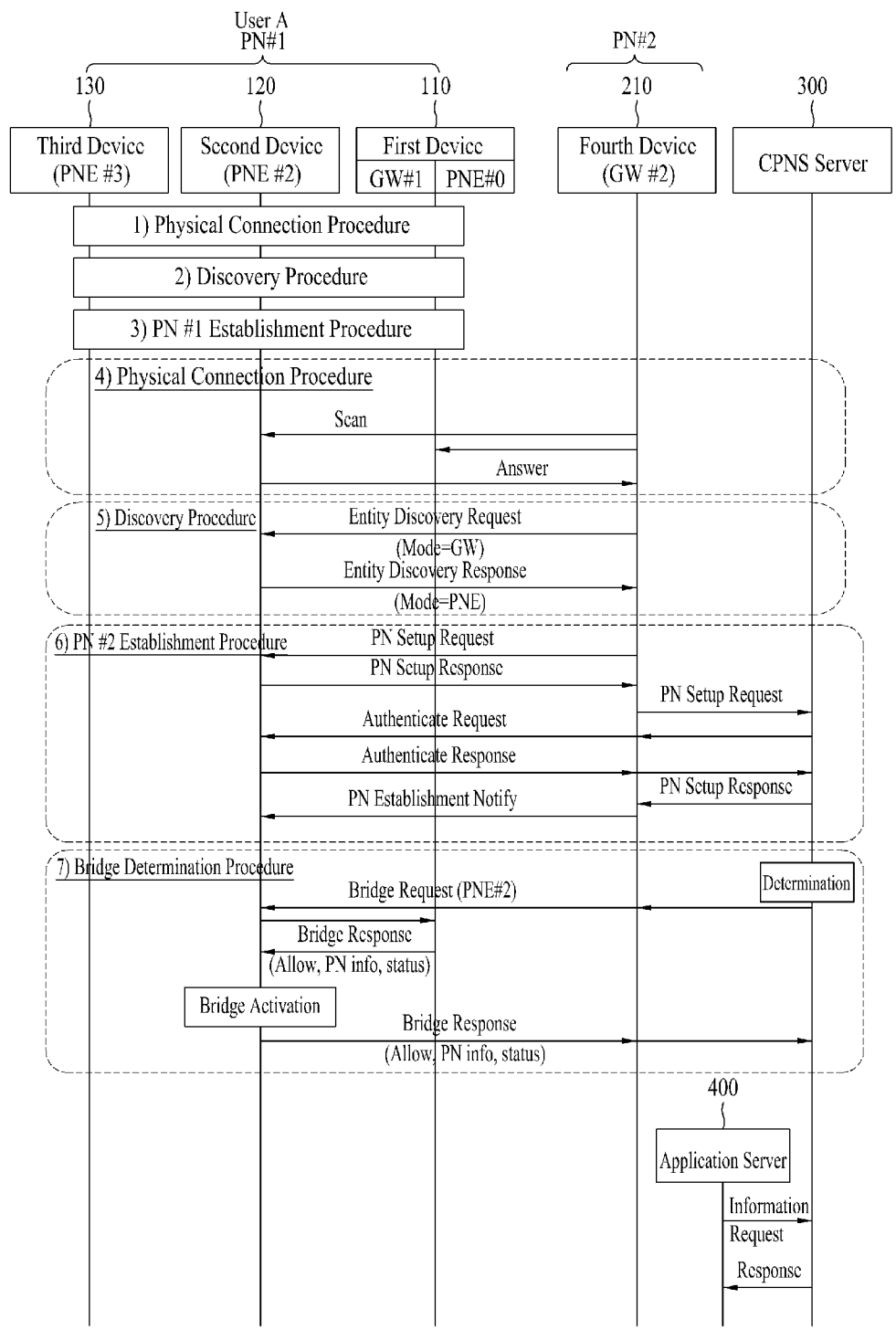
FIG. 6 is a diagram illustrating a signal flow for operating a device as a bridge according to an embodiment of the present invention.

FIG. 6 is a diagram illustrating a signal flow for operating a device as a bridge according to an embodiment of the present invention.

Referring to FIG. 6, the embodiment of the present invention provides a detailed procedure for operating a specific device, e.g. the second device 110, as a bridge.

In the embodiment of the present invention illustrated in FIG. 6, the CPNS server 300 is responsible for determining whether to operate a device as a bridge and selecting which device operates as a bridge from among the devices of User A.

User A owns the first device 110 operating as a GW (e.g. GW #1), the second device 120 operating as PNE #2, and a third device 130 operating as PNE #3. It is assumed herein that the first device 110 is a cellular phone and the second device 120 and the third device 130 are portable multimedia devices.

If the first, second and third devices 110, 120 and 130 are close to one another, a physical connection procedure is performed among them. The CPNS-enabled entity of the first device 110 reads its mode setting value and activates a GW entity and deactivates a PNE according to the mode setting value. Similarly, the CPNS-enabled entities of the second and third devices 120 and 130 read their mode setting values, and activate PNEs and deactivate GW entities according to their mode setting values.

2) Subsequently, the first, second and third devices 110, 120 and 130 perform mutual discovery procedures.

3) The first, second and third devices 110, 120 and 130 establish PN #1 by performing a PN establishment procedure.

4) Meanwhile, it is assumed that User A geographically moves into the coverage of PN #2, carrying the second device 120. It is also assumed that PN #2 is managed by a fourth device 210 operating as a GW (e.g. GW #2).

In this situation, User A wants to receive a service from PN #2 through the third device 130 that is located outside the coverage of PN #2.

As User A geographically moves into the coverage of PN #2, carrying the second device 120, the fourth device 210 of PN #2 performs a physical connection procedure.

Specifically, the fourth device 210 may transmit a scan message to the second device 120. The second device 120 transmits an answer scan message to the fourth device 210 in response to the scan message. Then the second device 120 and the fourth device 210 start the physical connection procedure and exchange information required for their physical connection, for example, addresses, IP addresses, etc. After the information is exchanged, the fourth device 210 transmits a physical connection request message, e.g. a Pairing Request message, to the second device 120. The second device 120 transmits a physical connection response message, e.g. a Pairing Answer message, to the fourth device 210.

5) Upon completion of the physical connection procedure, if the CPNS-enabled entity of the fourth device 210 is set to the GW mode, the CPNS-enabled entity of the fourth device 210 transmits a discovery request message, e.g. an Discovery Request message, shortly after the physical connection is completely established. If the CPNS-enabled entities of the second device 120 and the fourth device 210 simultaneously transmit the Entity Discovery Request messages, information may be redundant. To avoid information redundancy, the fourth device 210 operating as a GW first transmits the Discovery Request message immediately after the physical connection is established.

The Discovery Request message may include the following elements.

EntityInfo element: It includes information about the CPNS-enabled entity that has transmitted the Discovery Request message.

Userinfo element: It includes information about the user of the CPNS-enabled entity that has transmitted the Discovery Request message. The information about the user may include sub-elements of User ID and User Name.

PNEID element (or attribute): It indicates the ID of a PNE, if the CPNS-enabled entity transmitting the Discovery Request message is the PNE.

PN GW ID element (or attribute): It indicates the ID of a PN GW, if the CPNS-enabled entity transmitting the Discovery Request message is the PN GW.

PNE Name or PN GW Name element: It provides the name of a PNE if the CPNS-enabled entity transmitting the Discovery Request message is the PNE or the name of a PN GW if the CPNS-enabled entity transmitting the Discovery Request message is the PN GW.

Mode element (or attribute): It provides information about the activated mode of the CPNS-enabled entity transmitting the Discovery Request message, which has a value indicating a PNE or a PN GW. If the activated mode of the CPNS-enabled entity is the PNE mode, the Mode element is 1. If the activated mode of the CPNS-enabled entity is the PN GW mode, the Mode element is 2. Since the CPNS-enabled entity of the third device is configured as a GW in FIG. 6, the Mode element is 2.

PN Info Req element (or attribute): It has a True value or a False value. If the CPNS-enabled entity transmitting the Discovery Request message is to acquire PN information stored by an entity that will receive the Discovery Request message, this element includes a True value.

UI Capabilities element (or attribute): If a PN GW should perform user interaction instead of a PNE, this element has a True value. The UI Capabilities element is set by the PNE. For instance, if the PNE does not have a user interface (UI), the PNE may set the UI Capabilities element to True so that the PN GW may interact with a user.

Zone based service support element (or attribute): It is set to True, if a PN GW can provide a zone-based service.

PN Info element: It is included if the CPNS-enabled entity transmitting the Discovery Request message is a PN GW. The PN Info element includes sub-elements of PN ID, PNE Info, etc. The PN ID sub-element indicates, in case of the presence of an existing PN, the ID of the PN. The PNE Info sub-element includes, in case of the presence of an existing PN, information about a PNE included in the PN. The PNE Info sub-element includes a PNE ID element and a PNE Name element.

The above-described configuration of the Entity Discovery Request message may be illustrated in Table 1 below.

TABLE 1

| Element | Description | | |
|---|---|---|---|
| UserInfo | UserID and UserName are included. | | |
| | UserID | ID of CPNS user | |
| | UserName | Name of CPNS user | |
| Entity Info | Abbreviation for Entity Information. The following sub-elements may be included: PNEID, PNGWID, Name, Mode, PN Info Req, UI Capa, Zone based service support, and Broadcast group key delivery support. | | |
| | PNEID | ID of PNE | |
| | PNGWID | ID of PN GW | |
| | Name | Name of PNE or PN GW | |
| | Mode | Mode of transmission entity. If the transmission entity is a PNE, Mode is 1, if the transmission entity is a PN GW, Mode is 2, and if the transmission entity can operate simultaneously as a PNE and a GW, Mode is 3. | |
| | PNInfoReq | If a PNE transmits the message and requests PN Info, PNInfoReq is set to True. | |
| | UICapa | If a device operating as a PNE does not have a UI, UICapa is set to True so that a PN GW can interact with a user. | |
| | Zone based service support | It is set to True, when a PN GW provides a zone-based service | |
| PN Info | If the transmission entity of the Discovery Request is a PN GW and the PN GW has a PN, PN Info includes PN information so that a PNE may join the PN. PN Info may include PN ID, Description, and PNE Info sub-elements. | | |
| | PNID | ID of PN | |
| | Description | Description of PN | |
| | PNE Info | It includes information about PNEs being members of the PN. It may include PNEID and PNE Name as sub-elements. It may further include Device Info as a sub-element. | |
| | PNEID | ID of PNE | |
| | PNEName | Name of PNE | |
| | Device Info | Information about the device. It may include a Mode element and an Inactive Mode element. | |
| | | Mode | Information about current activated mode |
| | | Inactive Mode | Information about deactivated mode |

Then the CPNS-enabled entity of the second device 120 checks a service element, e.g. Zone based service support, in the received discovery request message, e.g. the Discovery Request message.

The CPNS-enabled entity of the second device 120 checks the mode of the other party that has transmitted the received message from the Mode element of the message and checks the ID of the other party in the Entity Info element.

If the mode of the other party is the GW mode (GW #2), the CPNS-enabled entity of the second device 120 determines not to additionally transmit the Discovery Request message. Instead, the CPNS-enabled entity of the second device 120 generates an Discovery Response message, which may include the following elements.

Entity Info element: Information about the CPNS-enabled entity that has received the Discovery Request message. It includes User ID and User Name sub-elements.

PNE ID element: It indicates the ID of a PNE, if the CPNS-enabled entity receiving the Discovery Request message is the PNE.

PNE Name element: It specifies the name of a PNE, if the CPNS-enabled entity receiving the Discovery Request message is the PNE.

Mode element (or attribute): It has a value indicating the PNE mode.

UI Capa element: It is set to True if a PN GW is to interact with a user instead of a PNE. This is set by the PNE. For instance, if the PNE does not have a UI, it may set UI capa to True to allow the PN GW to interact with a user instead.

PN Info element: It is included if PN Info Req has been set to True in the received Discovery Request message. If PN Info Req has been set to True in the received Discovery Request message, the second device 120 operating as a PNE includes information about PN #1 that has been formed with the first device 110. The PN Info element may include a PN ID element, a Description element, etc.

PNE Info element: It provides information about members of the PN.

The above-described configuration of the Entity Discovery Response message may be illustrated in Table 2 below.

TABLE 2

| Element | Description |
|---|---|
| UserInfo | UserID and UserName are included.<br>UserID     ID of user<br>UserName    Name of user |
| Entity Info | Abbreviation for Entity Information. The following sub-elements may be included: PNEID, PNGWID, Name, Mode, PN Info Req, and UI Capa.<br>PNEID     ID of PNE<br>PNGWID    ID of PN GW<br>Name      Name of PNE or PN GW<br>Mode      Mode of transmission entity of the Discovery Response message. If the transmission entity is a PNE, Mode is 1, if the transmission entity is a PN GW, Mode is 2, and if the transmission entity can operate simultaneously as a PNE and a GW, Mode is 3.<br>UICapa    If a device operating as a PNE does not have a UI, UICapa is set to True so that a PN GW can interact with a user. |
| PNInfo | If the transmission entity of the Discovery Response message is a PNE and the PNE has already joined another PN, PN Info includes information about the PN. PNInfo may include PN ID, Description, and PNE Info sub-elements.<br>PNID     ID of PN<br>Description   Description of PN<br>PNEInfo    It includes information about PNEs being members of the PN. It may include PNEID and PNE Name as sub-elements. It may further include Device Info as a sub-element.<br>    PNEID    ID of PNE<br>    PNEName   Name of PNE<br>    DeviceInfo   Information about the device. It may include a Mode element and an InactiveMode element.<br>       Mode    Information about current activated mode<br>       Inactive Mode   Information about deactivated mode |

Upon receipt of the Entity Discovery Response message from the second device 120, the fourth device 210 checks the elements of the Entity Discovery Response message. That is, the fourth device 210 determines the mode of the second device 120 by checking the Mode element and identifies devices included in PN #1 and the modes of the devices by additionally checking the PN info element in the received Entity Discovery Response message.

Upon completion of the Discovery procedure by exchanging the above-described signals, the fourth device 210 performs the PN establishment procedure.

Specifically, to allow the second device 120 to join PN #2, the fourth device 210 starts a PN #2 establishment procedure. To be more specific, the CPNS-enabled entity of the fourth device 210 transmits a PN setup request message, e.g. a PN Setup Request message, to the second device 120. The PN Setup Request message may include information about the GW and information about entities (e.g. the CPNS-enabled entity of the first device 110) to join the PN to be created.

The PN Setup Request message may have a configuration as illustrated in Table 3 below.

TABLE 3

| Element | Description |
|---|---|
| Origin Entity ID | ID of CPNS-enabled entity that will establish a PN |
| PN Setup Type | Indicates how the PN should be established. 1: PN GWs and PNEs are included in a one-to-one correspondence. 2: A PNE is allowed to establish a PN with all devices connected to a PN GW. 3: A PN is established only with specific invited PNEs. |
| Invited PNE ID | IDs of PNEs to be invited during PN setup procedure. |
| PN Info | Information about the PN to be registered and stored in the CPNS server. The following elements may be included: PNID, Description, Disclosure, Ownership Entity, PN GW Info, and PNE Info.<br>PN ID           ID of PN<br>Description     Description of PN (e.g. Home, Office)<br>PN GW Info    Information about PN GW. PNGWID and PN GW Name elements are included.<br>    PNGW ID     ID of PN GW<br>    PN GW Name   Name of PN GW<br>PNE Info      Information about PNE. PNEID, PNE Name, Mode, Description, Device Capa, and Service Profile elements may be included.<br>    PNE ID       ID of PNE<br>    PNE Name    Name of PNE<br>    Mode         Information about mode of PNE<br>    Description    Description of PN<br>    Device Capa   Information about the capabilities of device including PNE<br>    Service Profile    Information about CPNS-enabled application or information about content supporting a specific service or state. |
| Auth IniData | Information used to start PNE authentication procedure. AuthPNEID, rand_PNE, and LocalEUKeyAssignment may be included.<br>AuthPNEID           ID of target PNE to be authenticated by CPNS server<br>Rand_PNE            Random value generated by PNE<br>LocalEUKeyAssignment   Flag indicating need of assigning LocalEUKey. TRUE: necessary, FALSE: unnecessary |

Upon receipt of the PN Setup Request message, the PNE of the CPNS-enabled entity of the second device 120 checks the Origin Entity ID element in order to determine who will establish a PN, and extracts the PN ID and Msg ID elements from the message.

The CPNS-enabled entity operating as the PNE in the second device 120 generates a PN setup response message as follows.

First of all, the CPNS-enabled entity operating as the PNE includes a response to the PN setup request message in a Return element in the PN setup response message. In case of success, the response is set to 1 and in case of failure, the response is set to 2. Subsequently, the CPNS-enabled entity of the second device 20 includes a PN Info element providing its preserved PN information in the PN setup response message. The CPNS-enabled entity of the second device 120 also includes its preserved information about PNEs within the PN in a PNE Info element of the PN setup response message. Besides, the CPNS-enabled entity of the second device 120 includes many other elements in the PN setup response message.

The generated message may have the configuration illustrated in Table 4.

TABLE 4

| Element | Description | |
|---|---|---|
| Return | Indicates whether the PN SETUP Request is accepted or not. 1: OK, 2: Failed, that is, CPNS-enabled entity cannot process the request, and 3: Not allowed. | |
| PNInfo | Information about PN. PNID, Description, PN GW Info, and PNE Info may be included. | |
| | PN ID | ID of PN |
| | Description | Description of PN |
| | PN GW Info | Information about PN GW. PNGWID and PN GW Name may be included. |
| | PNGWID | ID of PN GW |
| | PNGW Name | Name of PN GW |
| | PNE Info | Information about PNE. PNEID, PNEName, Mode, Description, DeviceCapa, and Service Profile may be included. |
| | PNE ID | ID of PNE |
| | PNE Name | Name of PNE |
| | Mode | Information about device mode |
| | Description | Description of PN |
| | Device Capa | Information about the capabilities of device including PNE |
| | Service Profile | Information about CPNS-enabled application or information about content supporting a specific service or state. |
| Auth IniData | Information used to start PNE authentication procedure. AuthPNEID, rand_PNE, and LocalEUKeyAssignment may be included. | |
| | AuthPNEID | ID of target PNE to be authenticated by CPNS server |
| | Rand_PNE | Random value generated by PNE |
| | LocalEUKeyAssignment | Flag indicating need of assigning LocalEUKey. TRUE: necessary, FALSE: unnecessary |
| | Auth FinData | Information used for PNE to authenticate CPNS server. HASH is included |
| | HASH | Hash value calculated by target PNE or PN GW |

Upon completion of creating the PN setup response message, e.g. the PN Setup Response message, the CPNS-enabled entity of the second device 120 transmits the generated message to the fourth device 210.

Upon receipt of the PN setup response message, e.g. the PN Setup Response message, the CPNS-enabled entity of the fourth device 210 checks the Return element in the received message to determine whether the second device 120 wants to join the PN. If the Return element is set to 1, the CPNS-enabled entity of the fourth device 210 generates information about a PN inventory for the corresponding PN and creates and maintains a routing table based on information set in the received message.

Meanwhile, the CPNS-enabled entity of the fourth device 210 generates a PN setup request message, e.g. a PN Setup Request message, to be transmitted to the CPNS server 300.

Specifically, the CPNS-enabled entity of the four device 210 includes the ID of the PN GW in the OriginEntityID element, and includes information about the PN to be established in the PN Info element of the PN Setup Request message. The PN Info element includes the PN ID element having the ID of the PN established by the PN GW and the Description element having a description of the PN to be established. In addition, the CPNS-enabled entity of the fourth device 210 includes the PN GW Info element in the PN Setup Request message. The PN GW Info includes the PN GW ID element indicating the ID of the PN GW, and the PN GW Name element indicating the name of the PN GW. Further, the CPNS-enabled entity of the fourth device 210 includes the PNE Info element and the Auth Ini Data element in the PN Setup Request message.

Upon completion of generating the PN Setup Request message, the CPNS-enabled entity transmits the generated PN Setup Request message to the CPNS server 300.

Upon receipt of the PN Setup Request message from the fourth device 210, the CPNS server 300 generates an authentication request message, e.g. an Authenticate Request message, and transmits the Authenticate Request message to the second device 120 through the fourth device 210.

The second device 120 transmits an authentication response message to the CPNS server 300 through the fourth device 210.

If the authentication turns out successful in the authentication response message, the CPNS server 300 registers the PN information included in the PN Setup Request message and stores the PN information in a PN inventory.

The CPNS server 300 generates a PN Setup Response message and transmits it to the fourth device 210.

Upon receipt of the PN Setup Response message from the CPNS server 300, the fourth device 210 stores the PN information in a local PN inventory. Then the third device 210 transmits a PN setup notification message, e.g. a PN Establishment Notify message, and transmits it to the second device 120.

Upon completion of the PN #2 establishment procedure as described above, a bridge determination procedure is performed.

Specifically, the CPNS server 300 determines whether to operate one of the devices of User A within PN #1 as a bridge. If one of the devices is determined to operate as a bridge, the CPNS server 300 also determines a device to operate as a bridge from among the devices. In the illustrated case of FIG. 6, it is assumed that the second device 200 is selected as a bridge, by way of example.

When the second device 120 is selected as a bridge, the CPNS server 300 transmits a bridge request message, e.g. a Bridge Request message, to the second device 120 through the fourth device 210. The bridge request message may include the ID of the device determined as the bridge.

Upon receipt of the bridge request message, the second device 120 forwards the bridge request message to the first device 110 which is the GW of PN #1 to which the second device 120 belongs.

Upon receipt of the bridge request message, the first device 110 determines whether to operate the second device 120 as a bridge based on a user setting, etc.

When determining to operate the second device 120 as a bridge, the first device 110 transmits a bridge response message, e.g. a Bridge Response message, including an indication indicating allowance to the second device 120. The bridge response message may include information about PN #1. The bridge response message may further include information about the states of the devices within PN #1.

Upon receipt of the bridge response message, the second device 120 determines whether its operation as a bridge has been allowed by checking the indication in the bridge response message.

If the indication indicates that the bridge operation is allowed, the second device 210 activates a bridge and forwards the bridge response message to the CPNS server 300 through the fourth device 210.

Meanwhile, in the presence of service data to be provided to User A, the application server 400 transmits an information request message to the CPNS server 300, because it has no knowledge as to the locations of the devices of User A and a device to receive the service data from among the devices. The information request message may include the ID of User A.

Upon receipt of the information request message from the application server 400, the CPNS server 300 locates the devices of User A based on the ID of User A. If the second device 120 is located within the coverage of PN #2, the CPNS server 300 transmits information indicating that the second device 120 operates as a bridge to the application server 400.

The application server 400 may transmit the service data to the second device 120 of User A based on the received information.

The procedure for operating a specific device, e.g. the second device 120, as a bridge according to the embodiment of the present invention has been described above.

Figure 7:
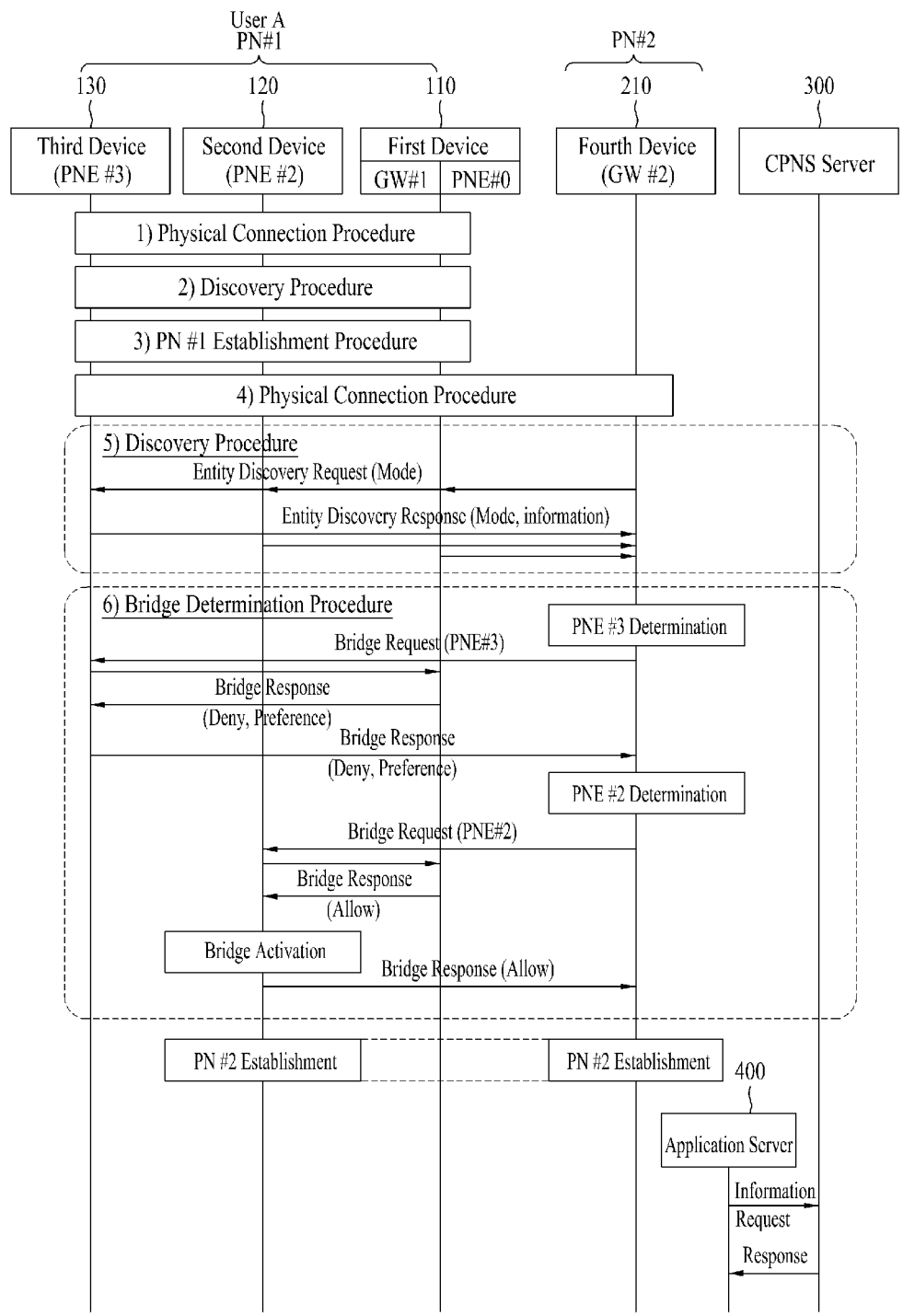
FIG. 7 is a diagram illustrating a signal flow for operating a device as a bridge according to another embodiment of the present invention.

FIG. 7 is a diagram illustrating a signal flow for operating a device as a bridge according to another embodiment of the present invention.

As noted from FIG. 7, the fourth device 210 is responsible for determining whether to operate any of the devices of User A as a bridge and determining which device to operate as a bridge if it is determined to operate any device as a bridge, as compared to the first embodiment of the present invention.

Referring to FIG. 7, User A owns the first device 110 operating as a GW (e.g. GW #1), the second device 120 operating as PNE #2, and the third device 130 operating as PNE #3. It is assumed herein that the first device 110 is a cellular phone and the second and third devices 120 and 130 are portable multimedia devices.

1) If the first, second and third devices 110, 120 and 130 are close to one another, a physical connection procedure is performed among them. The CPNS-enabled entity of the first device 110 reads its mode setting value and activates a GW entity and deactivates a PNE according to the mode setting value. Similarly, the CPNS-enabled entities of the second and third devices 120 and 130 read their mode setting values and activate PNEs and deactivate GW entities according to their mode setting values.

2) Subsequently, the first, second and third devices 110, 120 and 130 perform mutual discovery procedures.

3) The first, second and third devices 110, 120 and 130 establish PN #1 by performing a PN establishment procedure.

4) Meanwhile, it is assumed that User A geographically moves into the coverage of PN #2, carrying the first, second, and third devices 110, 120, and 130. It is also assumed that PN #2 is managed by the fourth device 210 operating as a GW (GW #2). In this situation, User A wants to receive a service from PN #2.

As User A geographically moves into the coverage of PN #2, carrying the first, second and third devices 110, 120, and 130, the fourth device 210 of PN #2 performs a physical connection procedure with one or more of the devices 110, 120 and 130.

5) Upon completion of the physical connection procedure, if the CPNS-enabled entity of the fourth device 210 is set to the GW mode, the CPNS-enabled entity of the fourth device 210 transmits a discovery request message, e.g. an Entity Discovery Request message, shortly after the physical connection is completely established. This operation has already been described with reference to FIG. 6 and thus will not be detailed herein.

The CPNS-enabled entity of the device that has received the Entity Discovery Request message determines the mode of the other party that has transmitted the received message from the Mode element of the message and checks the ID of the other party in the Entity Info element.

If the mode of the other party is the GW mode (GW #2), the CPNS-enabled entity of the device determines not to additionally transmit the Entity Discovery Request message. Instead, the CPNS-enabled entity of the device generates an Entity Discovery Response message. This operation has been described before with reference to FIG. 6 and will not be detailed herein.

Upon receipt of the Entity Discovery Response message from the device, the fourth device 210 checks the elements of the Entity Discovery Response message. That is, the fourth device 210 determines the mode of the device by checking the Mode element and identifies devices included in PN #1 and the modes of the devices by additionally checking the PN info element in the received Entity Discovery Response message.

6) Upon completion of the discovery procedure by exchanging the above-described signals, the fourth device 210 determines whether to operate one of the devices confirmed by the received Entity Discovery Response message as a bridge and, if determining to operate one of the devices as a bridge, determines which device to be selected as a bridge.

In the illustrated case of FIG. 7, the fourth device 210 selects the third device 200, PNE #3 as a bridge, by way of example. Accordingly, the fourth device 210 transmits a bridge request message, e.g. a Bridge Request message, to the third device 130. The Bridge Request message may include the ID of the device determined as the bridge (i.e. the ID of PNE #3).

Upon receipt of the Bridge Request message, the third device 130 forwards the Bridge Request message to the first device 110 being the GW of PN #1 to which the third device 130 belongs.

Upon receipt of the Bridge Request message, the first device 110 determines whether to operate the third device 130 as a bridge based on a user setting, etc. If it is not appropriate to operate the third device 130 as a bridge based on the user setting, etc., the first device 110 transmits a bridge response message, e.g. a Bridge Response message, including an indication indicating denial to the third device 130. The Bridge Response message may further include at least one of the user setting information and information about a device suitable as a bridge.

Upon receipt of the Bridge Response message, the third device 130 determines whether its operation as a bridge has been allowed by checking the indication in the Bridge Response message. If the indication indicates that the bridge operation is denied, the third device 130 forwards the Bridge Response message to the fourth device 210.

Upon receipt of the Bridge Response message, the fourth device 210 determines whether the bridge operation has been allowed by checking the indication in the Bridge Response message. If the indication indicates that the bridge operation has been denied, the fourth device 210 re-selects a device suitable as a bridge based on the at least one of the user setting information and the preferred device information included in the Bridge Response message.

In FIG. 7, the fourth device 210 determines the second device 120, PNE #2 as a bridge, by way of example.

The fourth device 210 transmits a bridge request message, e.g. a Bridge Request message, to the second device 120.

Upon receipt of the Bridge Request message, the second device 120 forwards the Bridge Request message to the first device 110 being the GW of PN #1 to which the second device 120 belongs.

Upon receipt of the Bridge Request message, the first device 110 determines whether to operate the second device 120 as a bridge based on the user setting, etc.

If determining the second device 120 as a bridge, the first device 110 transmits a bridge response message, e.g. a Bridge Response message, including an indication indicating allowance to the second device 120. The Bridge Response message may further include information about PN #1. In addition, the Bridge Response message may include information about the states of the devices of PN #1.

Upon receipt of the Bridge Response message, the second device 120 determines whether its bridge operation has been allowed by checking the indication in the Bridge Response message.

If determining that its bridge operation has been allowed, the second device 120 activates a bridge and forwards the Bridge Response message to the fourth device 210.

After the second device 120 is determined as a bridge in the above procedures, the second and fourth devices 120 and 140 perform a PN #2 establishment procedure.

Meanwhile, in the presence of service data to be provided to User A, the application server 400 transmits an Information Request message to the CPNS server 300, because it has no knowledge as to the locations of the devices of User A and a device to receive the service data from among the devices. The Information Request message may include the ID of User A.

Upon receipt of the Information Request message from the application server 400, the CPNS server 300 locates the devices of User A based on the ID of User A. If the second device 120 is located within the coverage of PN #2, the CPNS server 300 transmits information indicating that the second device 120 operates as a bridge to the application server 400.

The application server 400 may transmit the service data to the second device 120 of User A based on the information.

In the second embodiment of the present invention as described above, the fourth device 210 acting as a GW determines whether to operate any device selected from among the devices of User A as a bridge and, if determining to operate any device as a bridge, selects a device as a bridge.

Figure 8:
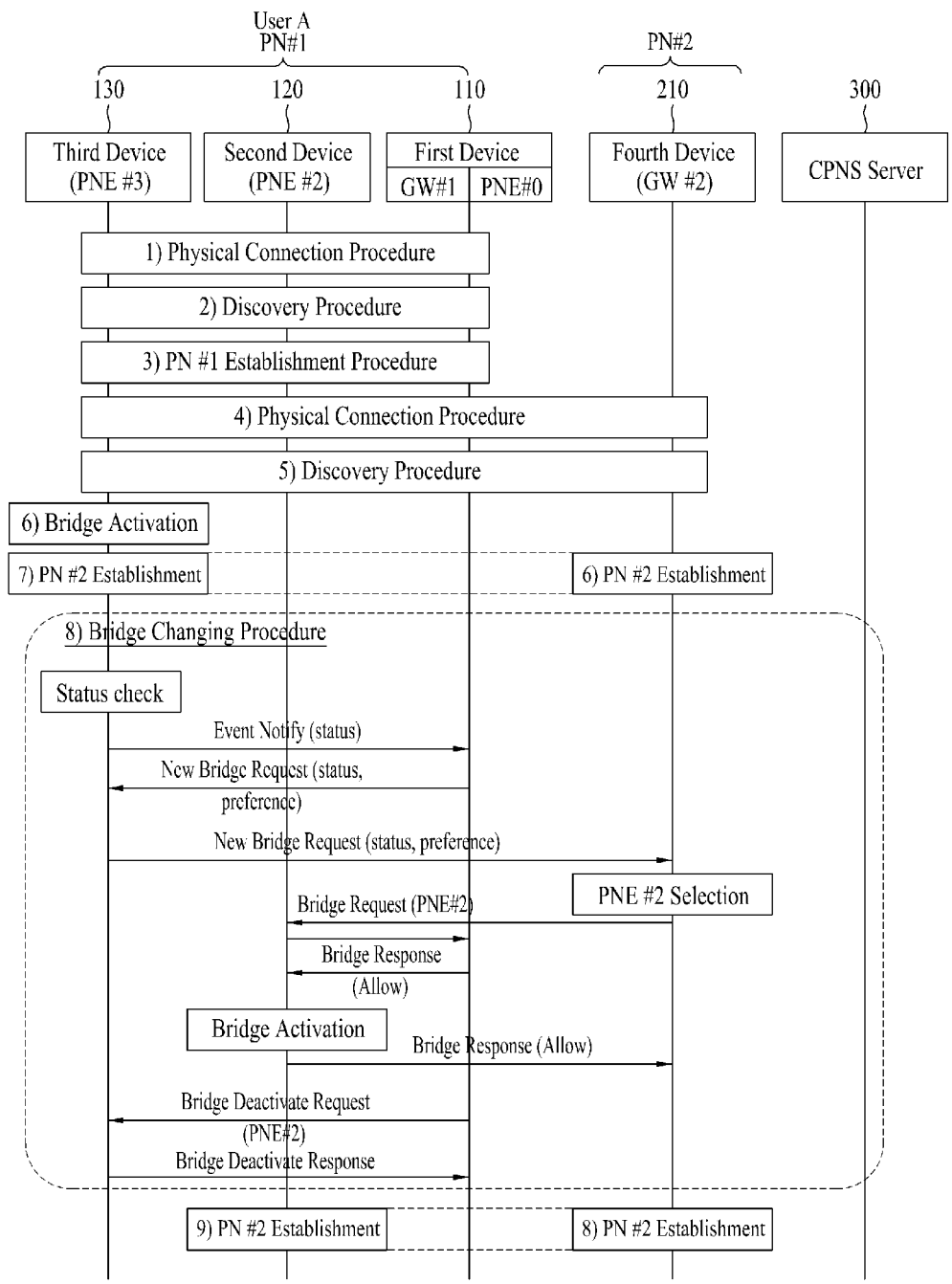
FIG. 8 is a diagram illustrating a signal flow for a procedure for changing a bridge to another device according to the state of a device operating as the bridge according to a third embodiment of the present invention.

FIG. 8 is a diagram illustrating a signal flow for a procedure for changing a bridge to another device according to the state of the device operating as the bridge according to a third embodiment of the present invention.

As noted from FIG. 8, User A owns the first device 110 operating as a GW (e.g. GW #1), the second device 120 operating as PNE #2, and the third device 130 operating as PNE #3. It is assumed herein that the first device 110 is a cellular phone and the second and third devices 120 and 130 are portable multimedia devices.

1) to 5): The procedures 1) to 5) are similar to those illustrated in FIG. 7 and thus their description will be cited from FIG. 7.

6) Upon completion of the discovery procedure, the third device 130 is determined as a bridge and activates a bridge according to the bridge determination procedure.

7) After the third device 130 is determined as a bridge, the third and fourth devices 130 and 140 perform the PN #2 setup procedure.

8) Meanwhile, if the third device 130 cannot operate as a bridge any longer due to its state, a bridge changing procedure is performed.

Specifically, if the third device 130 checks its state and determines that it cannot operate as a bridge any loner, the third device 130 transmits an event notification message, e.g. an Event Notify message, to the first device 110 being the GW. If the power of the third device 130 is not sufficient or the user does not want to operate the third device 130 as a bridge, the third device 130 cannot operate as a bridge any longer. The Event Notify message may be transmitted in conformance to a Device Management (DM) protocol. The Event Notify message may include information about the state of the third device 130.

If the first device 110 receives the Event Notify message and determines that the third device 130 is not suitable as a bridge based on the received message, the first device transmits a new bridge request message, e.g. a New Bridge Request message, to the third device 130. The New Bridge Request message may include at least one of information about the state of the third device 130 and the user setting information.

The third device 130 forwards the New Bridge Request message to the fourth device 210.

Upon receipt of the New Bridge Request message, the fourth device 210 selects a suitable bridge based on the at least one of the information about the state of the third device 130 and the user setting information.

In FIG. 8, the fourth device 210 determines the second device 120 being PNE #2 as a bridge.

The fourth device 210 transmits a bridge request message, e.g. a Bridge Request message, to the second device 120.

Upon receipt of the Bridge Request message, the second device 120 forwards the Bridge Request message to the first device 110 being the GW of PN #1 to which the second device 120 belongs.

Upon receipt of the Bridge Request message, the first device 110 determines whether to operate the second device 120 as a bridge based on the user setting, etc.

If determining the second device 120 as a bridge, the first device 110 transmits a bridge response message, e.g. a Bridge Response message, including an indication indicating allowance to the second device 120. The Bridge Response message may further include information about PN #1. In addition, the Bridge Response message may include information about the states of the devices of PN #1.

Upon receipt of the Bridge Response message, the second device 120 determines whether its bridge operation has been allowed by checking the indication in the Bridge Response message.

If determining that its bridge operation has been allowed, the second device 120 activates a bridge and forwards the Bridge Response message to the fourth device 210.

Meanwhile, the first device 110 transmits a Bridge Deactivate Request message to the third device 130. The Bridge Deactivate Request message includes information about the new selected bridge, e.g. PNE #2.

Upon receipt of the Bridge Deactivate Request message, the third device 130 checks information in the received message. When confirming that the new selected bridge operates normally, the third device 130 deactivates its bridge and transmits a Bridge Deactivate Response message to the first device 110.

9) After the second device 120 is determined as a bridge, the second and fourth devices 120 and 140 perform the PN #2 establishment procedure.

Figure 9:
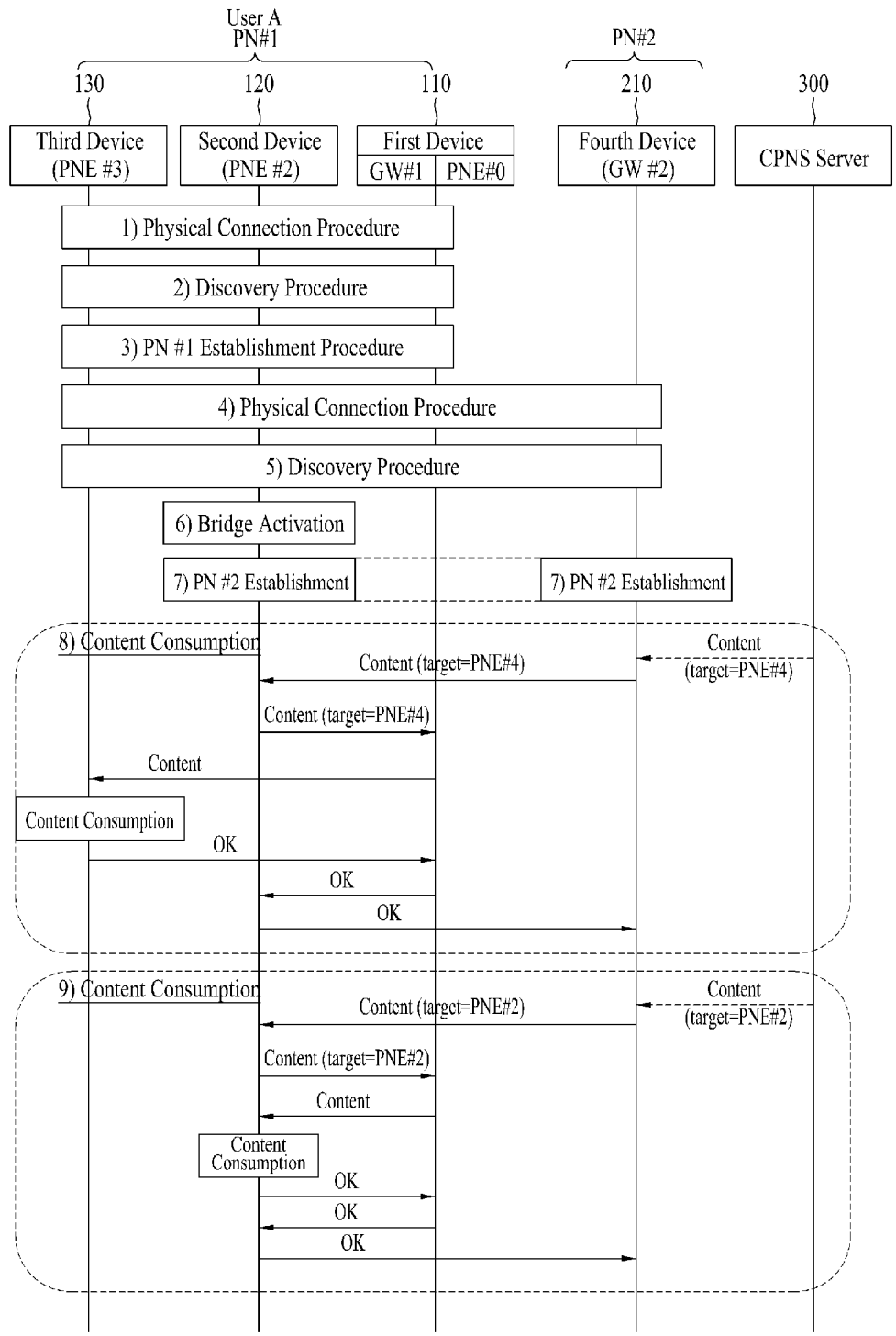
FIG. 9 is a diagram illustrating a signal flow for a procedure for using content or a service at a device after the device operates as a bridge according to the first, second, or third embodiment of the present invention.

FIG. 9 is a diagram illustrating a signal flow for a procedure for using content or a service at a device after the device operates as a bridge according to the first, second, or third embodiment of the present invention.

As noted from FIG. 9, User A owns the first device 110 operating as a GW (e.g. GW #1), the second device 120 operating as PNE #2, and the third device 130 operating as PNE #3. It is assumed herein that the first device 110 is a cellular phone and the second and third devices 120 and 130 are portable multimedia devices.

1) to 5): The procedures 1) to 5) are similar to those illustrated in FIG. 7 and thus their description will be cited from FIG. 7.

6) Upon completion of the discovery procedure, the second device 120 is determined as a bridge and activates a bridge according to the bridge determination procedure.

7) After the second device 120 is determined as a bridge, the second and fourth devices 120 and 140 perform the PN #2 establishment procedure.

8) In the presence of content to be provided to the third device 130 through the second device 120 acting as the bridge, the CPNS server 300 transmits the content to the fourth device 210. Then the fourth device 210 forwards the content to the second device 120 acting as the bridge.

Then the second device 120 forwards the content to the first device 110 being its GW. The first device 110 transmits the content to the third device 130. The third device 130 uses the content and transmits an OK message to the first device 110. The first device 110 forwards the OK message to the second device 120 being the bridge and the second device 120 in turn transmits the OK message to the fourth device 210.

9) Meanwhile, while the second device 120 may operate as a bridge, it may also receive and use content directed to it. Associated procedures may be known from FIG. 8 as is obvious to those skilled in the art and thus their detailed description is not provided herein.

Figure 10:
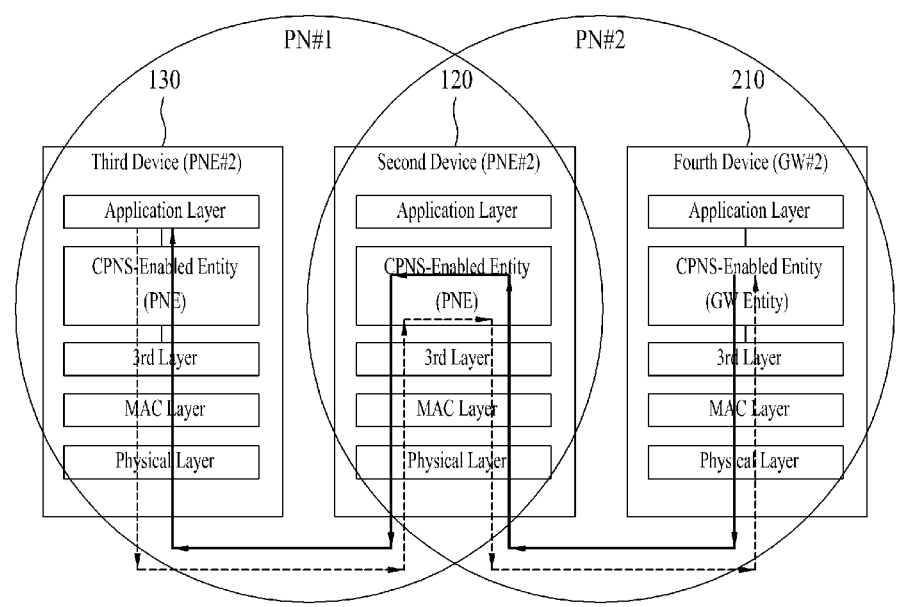
FIG. 10 illustrates the architecture of devices after mode changing.

FIG. 10 illustrates the architecture of devices after mode changing.

As noted from FIG. 10, each of the second, third and fourth devices 120, 130 and 210 has a physical layer, a MAC layer, a 3rd layer, a CPNS-enabled entity, and an application layer. PNEs are activated in the CPNS-enabled entities of the second and third devices 120 and 130, whereas a GW entity is activated in the CPNS-enabled entity of the fourth device 210.

As indicated by a bold solid line, service data is transferred to the second device 120 through the CPNS-enabled entity, 3rd layer, MAC layer, and physical layer of the fourth device 210. In the second device 120, the PNE of the CPNS-enabled entity receives the service data through the physical layer, the MAC layer, and the 3rd layer. The PNE forwards the service data to the third device 130 through the 3rd layer, the MAC layer, and the physical layer.

Figure 11:
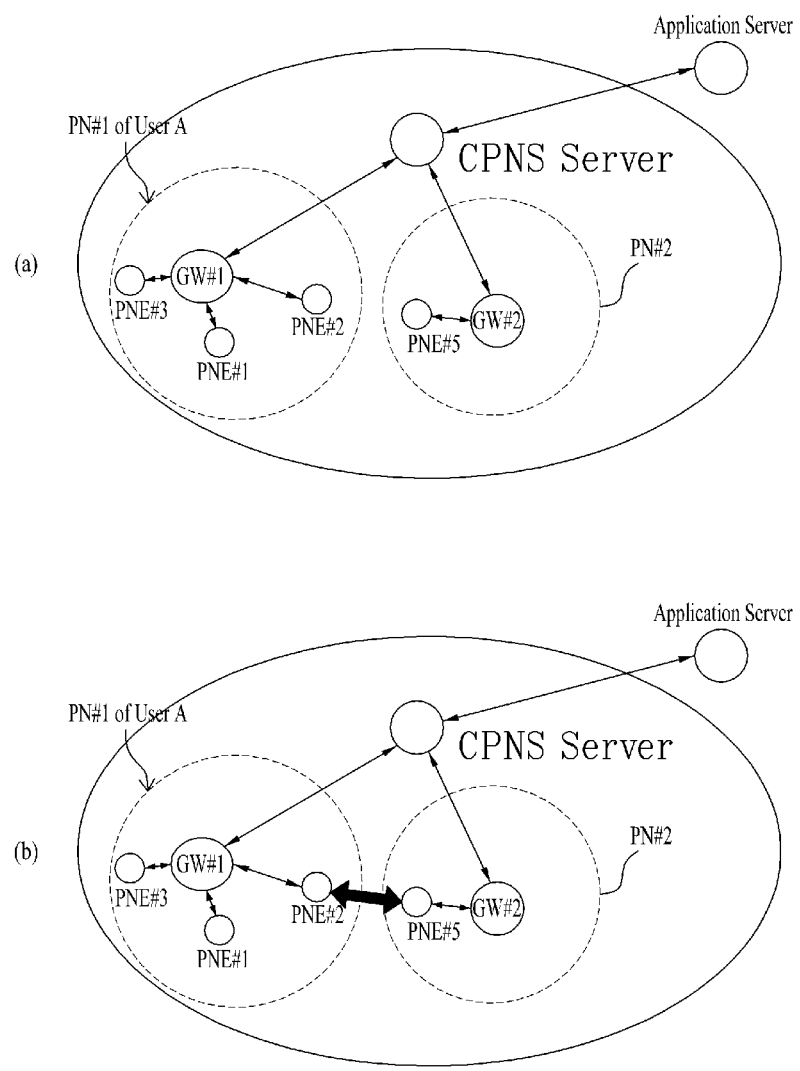
FIG. 11 illustrates an example of operating two devices as bridges.

FIG. 11 illustrates an example of operating two devices as bridges.

In FIG. 11(*a*), two PNs, a CPNS server, and an application server are illustrated, by way of example. PN #1 between the two PNs was established by User A. PN #1 is composed of the devices of User A, for example, GW #1, PNE #1, PNE #2, and PNE #3. It is assumed that GW #1 is a cellular phone of User A and PNE #1, PNE #2, and PNE #3 are portable multimedia devices of User A. Meanwhile, the other PN, PN #2 includes GW #2 and PNE #5. The application server may provide a service to the PNEs of each PN through the CPNS server, GN #1 and GN #2.

Meanwhile, User A wants to receive a service from PN #2. However, unless User A geographically moves into the coverage of PN #2, User A cannot receive the service from PN #2.

To solve this problem, if PNE #1 of PN #1 can communicate with PNE #5 of PN #2, it is possible to provide the service to User A from PN #2 by operating PNE #1 and PNE #5 as bridges.

This method will be described in greater detail with reference to FIGS. 12 and 13.

Figure 12:
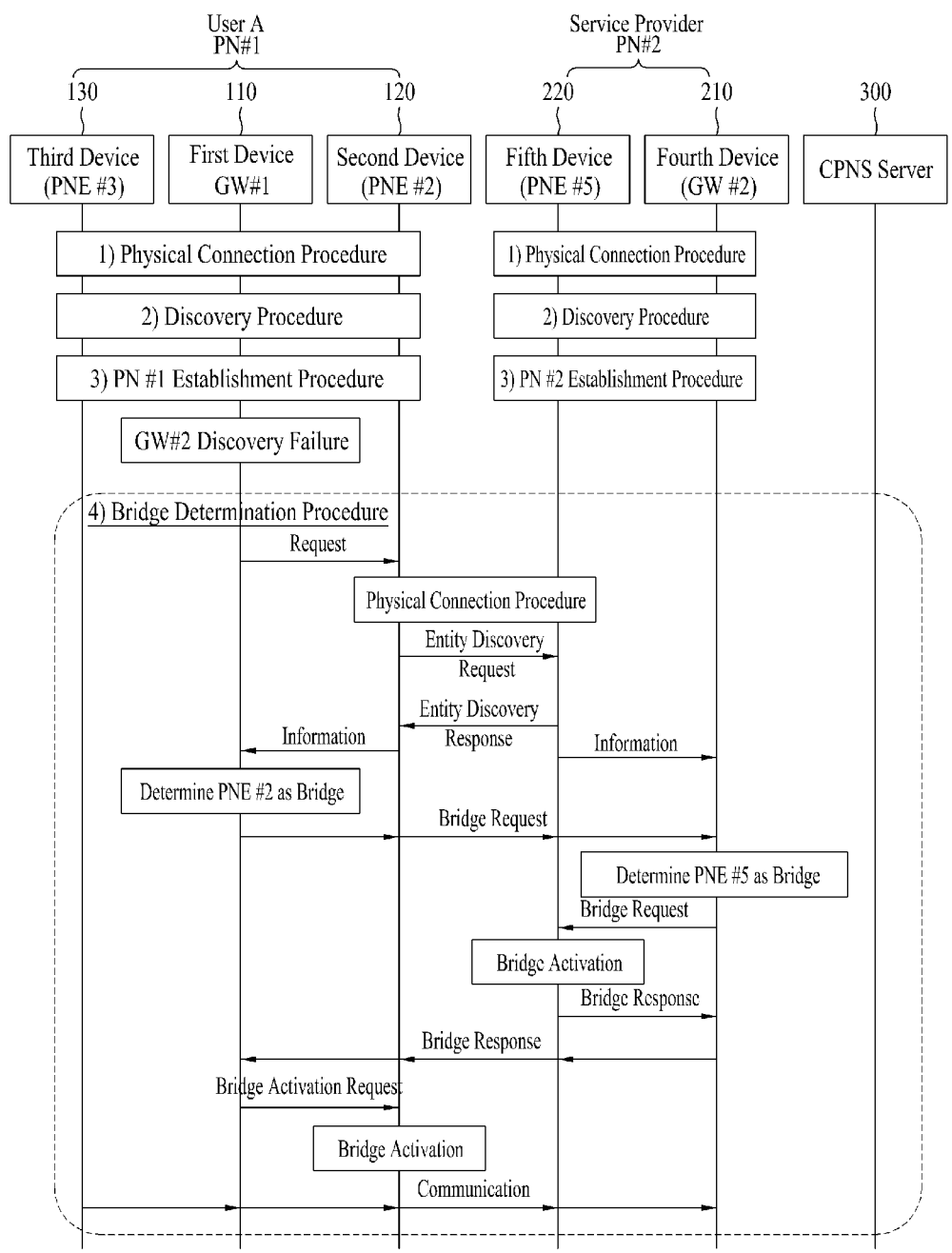
FIG. 12 is a diagram illustrating a signal flow for a procedure for operating two devices as bridges according to a fourth embodiment of the present invention.

FIG. 12 is a diagram illustrating a signal flow for a procedure for operating two devices as bridges according to a fourth embodiment of the present invention.

Referring to FIG. 12, User A owns the first device 110 operating as a GW (e.g. GW #1), the second device 120 operating as PNE #2, and the third device 130 operating as PNE #3. It is assumed herein that the first device 110 is a cellular phone and the second and third devices 120 and 130 are portable multimedia devices. A service provider owns the fourth device 210 operating as a GW (e.g. GW #2) and a fifth device 220 operating as PNE #5.

1) If the first, second and third devices 110, 120 and 130 of User A are close to one another, the physical connection procedure is performed among them. If the fourth and fifth devices 210 and 220 of the service provider are close to each another, the physical connection procedure is performed between them.

2) Subsequently, the first, second and third devices 110, 120 and 130 perform mutual discovery procedures. In addition, the fourth and fifth devices 210 and 220 also perform mutual discovery procedures.

3) The first, second and third devices 110, 120 and 130 establish PN #1 by performing the PN establishment procedure. The fourth and fifth devices 210 and 220 also establish PN #2 by performing the PN establishment procedure.

The first device 110 of User A wants to receive a service from the service provider but fails to discover the fourth device 210 being GW #2 of the service provider.

4) Then, the first device 110 performs the bridge determination procedure to receive the service from the fourth device 210 being GW #2 of the service provider 110.

Specifically, the first device 110 transmits a Request message to the second device 120 operating as a PNE.

Then the second device 120 performs the physical connection procedure with physically connectable adjacent devices, for example, the fifth device 220. Upon completion of the physical connection procedure, the second device 120 transmits a discovery request message, e.g. an Entity Discovery Request message, to the fifth device 220. The second device 120 includes an element having information about PN #1 and an element having information about GW #1 in the Entity Discovery Request message.

Upon receipt of the Entity Discovery Request message, the fifth device 220 transmits a discovery response message, e.g. an Entity Discovery Response message, to the second device 120. The fifth device 220 includes a PN info element with its preserved information about PN #2 and an element with information about GW #2 in the Entity Discovery Response message.

Upon receipt of the Entity Discovery Response message, the second device 120 extracts information from the elements of the message and transmits the extracted information to the first device 110. Similarly, the fifth device 220 extracts information from the elements of the Entity Discovery Request message and transmits the extracted information to the fourth device 210.

The first and fourth devices 110 and 210 determine based on the received information whether they can be connected to each other through the second and fifth devices 120 and 220. If the first and fourth devices 110 and 210 can be connected to each other through the second and fifth devices 120 and 220, the first device 110 determines to operate the second device 120, PNE #2 as a bridge.

The first device 110 transmits a Bridge Request message to the second device 120. The second device 120 transmits the Bridge Request message to the fifth device 220 and the fifth device 220 in turn transmits the Bridge Request message to the fourth device 210.

Upon receipt of the Bridge Request message, the fourth device 210 determines to operate the fifth device 220, PNE #5 as a bridge and transmits the Bridge Request message to the fifth device 220.

Upon receipt of the Bridge Request message from the fourth device 210, the fifth device 220 activates a bridge function and transmits a Bridge Response message to the fourth device 210.

The fourth device 210 transmits the Bridge Response message to the first device 110 through the fifth and second devices 220 and 120.

Upon receipt of the Bridge Response message, the first device 110 transmits a Bridge Request message to the second device 120. Then the second device 120 activates the bridge function according to the Bridge Request message received from the first device 110.

As the second and fifth devices 120 and 150 operate as bridges in this manner, PN #1 of User A may be connected to PN #2 of the service provider. Therefore, User A can receive a service from PN #2 through an arbitrary device of PN #1.

Figure 13:
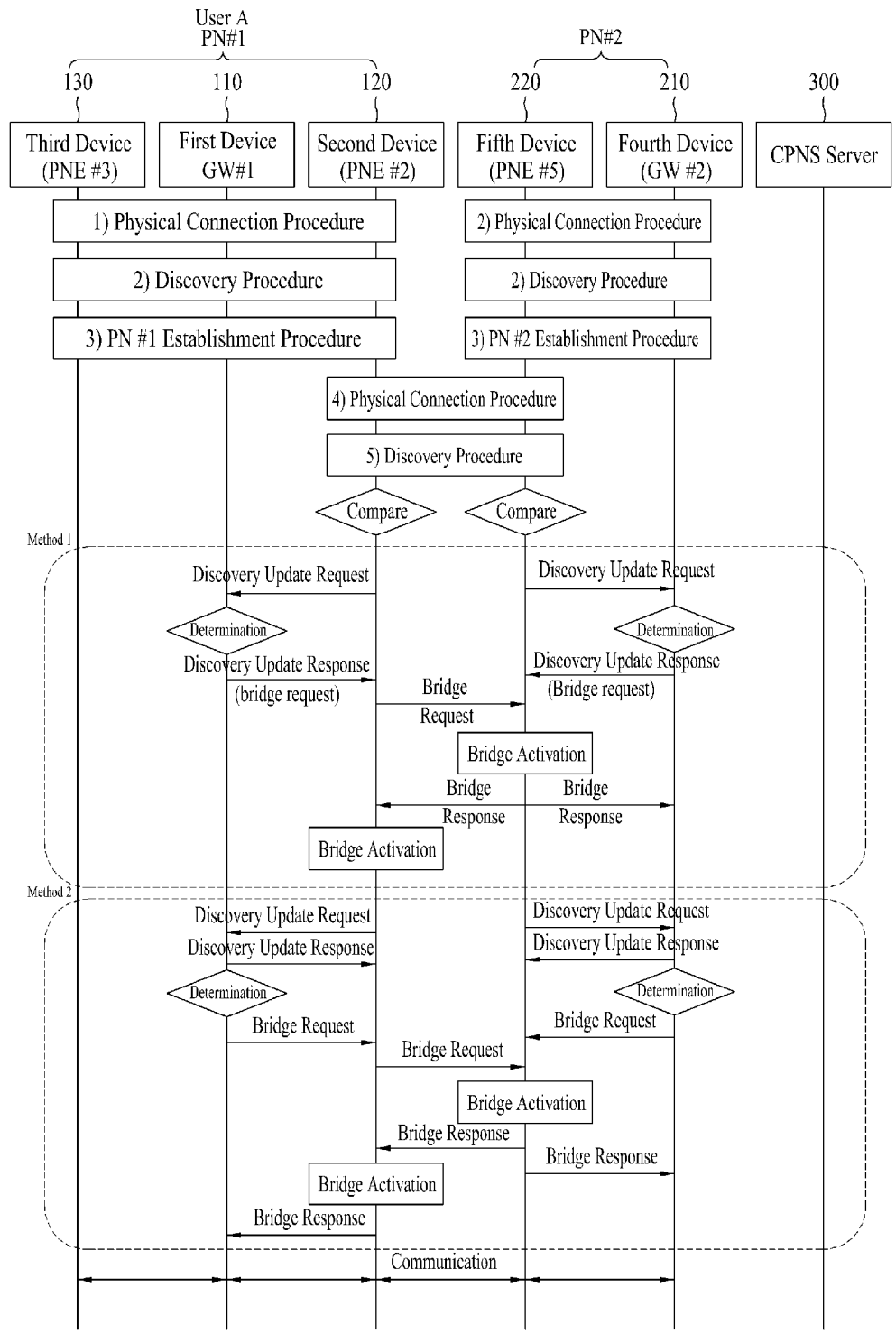
FIG. 13 is a diagram illustrating a signal flow for a procedure for operating two devices as bridges according to a fifth embodiment of the present invention.

FIG. 13 is a diagram illustrating a signal flow for a procedure for operating two devices as bridges according to a fifth embodiment of the present invention.

As illustrated in FIG. 13, User A owns the first device 110 operating as a GW (e.g. GW #1), the second device 120 operating as PNE #2, and the third device 130 operating as PNE #3. It is assumed herein that the first device 110 is a cellular phone and the second and third devices 120 and 130 are portable multimedia devices. The service provider owns the fourth device 210 operating as a GW (e.g. GW #2) and the fifth device 220 operating as PNE #5.

1) If the first, second and third devices 110, 120 and 130 of User A are close to one another, the physical connection procedure is performed among them. If the fourth and fifth devices 210 and 220 of the service provider are close to each another, the physical connection procedure is performed between them.

2) Subsequently, the first, second and third devices 110, 120 and 130 perform mutual discovery procedures. In addition, the fourth and fifth devices 210 and 220 also perform mutual discovery procedures.

3) The first, second and third devices 110, 120 and 130 establish PN #1 by performing the PN establishment procedure. The fourth and fifth devices 210 and 220 also establish PN #2 by performing the PN establishment procedure.

4) Meanwhile, the second device 120 performs the physical connection procedure with physically connectable adjacent devices, for example, the fifth device 220.

5) Upon completion of the physical connection procedure, the second device 120 and the fifth device 220 perform the discovery procedure.

Specifically, the second device 120 transmits a discovery request message, e.g. an Entity Discovery Request message, to the fifth device 220. The second device 120 includes an element having information about PN #1 and an element having information about GW #1 in the Entity Discovery Request message.

The fifth device 220 transmits a discovery response message, e.g. an Entity Discovery Response message, to the second device 120 in response to the Entity Discovery Request message. The fifth device 220 includes a PN info element with its preserved information about PN #2 and an element with information about GW #2 in the Entity Discovery Response message.

Upon receipt of the Entity Discovery Response message, the second device 120 extracts information from the elements of the message and compares the extracted information with existing information. Similarly, the fifth device 220 extracts information from the elements of the Entity Discovery Request message and compares the extracted information with existing information.

If the extracted information is different from the existing information, a discovery update procedure and the bridge determination procedure are performed, which may be considered in two ways.

According to a first method (Method 1), the second and fifth devices 120 and 220 transmit Discovery Update Request messages respectively to the first and fourth devices 110 and 210. The Discovery Update Request messages may include the extracted information.

The first and fourth devices 110 and 210 determine based on information included in the Discovery Update Request messages whether they can be connected to each other through the second and fifth devices 120 and 220.

If the first and fourth devices 110 and 210 can be connected to each other through the second and fifth devices 120 and 220, the first device 110 determines to operate the second device 120, PNE #2 as a bridge. Likewise, the fourth device 210 determines to operate the fifth device 220, PNE #5 as a bridge.

The first and fourth devices 110 and 210 transmit Discovery Update Response messages respectively to the second and fifth devices 120 and 220. Each of the Discovery Update Response messages may include a message, indication, or value indicating a bridge request.

Upon receipt of the Discovery Update Response message, the second device 120 checks the message, indication, or value included in the received message and transmits the Bridge Request message to the fifth device 220 according to the check.

The fifth device 220 activates the bridge function according to the Bridge Request message received from the second device 120 and the message, indication, or value included in the Discovery Update Response message received from the fourth device 210, and transmits a Bridge Response message to the second and fourth devices 120 and 210. Upon receipt of the Bridge Response message, the second device 120 also activates the bridge function, confirming that the fifth device 220 operates as a bridge.

According to a second method (Method 2), if the extracted information is different from the existing information, the second and fifth devices 120 and 220 transmit Discovery Update Request messages respectively to the first and fourth devices 110 and 210. The Discovery Update Request messages may include the extracted information.

The first and fourth devices 110 and 210 transmit Discovery Update Response messages respectively to the second and fifth devices 120 and 220.

Subsequently, the first and fourth devices 110 and 210 determine based on information included in the Discovery Update Request messages whether they can be connected to each other through the second and fifth devices 120 and 220.

If the first and fourth devices 110 and 210 can be connected to each other through the second and fifth devices 120 and 220, the first device 110 determines to operate the second device 120, PNE #2 as a bridge. Likewise, the fourth device 210 determines to operate the fifth device 220, PNE #5 as a bridge.

The first and fourth devices 110 and 210 transmit Bridge Request messages respectively to the second and fifth devices 120 and 220.

Upon receipt of the Bridge Request message, the second device 120 transmits the Bridge Request message to the fifth device 220.

The fifth device 220 activates the bridge function according to the Bridge Request messages received from the second and fourth devices 120 and 210, and transmits a Bridge Response message to the second and fourth devices 120 and 210.

Upon receipt of the Bridge Response message, the second device 120 also activates the bridge function, confirming that the fifth device 220 operates as a bridge.

As the second and fifth devices 120 and 150 operate as bridges in this manner, PN #1 of User A may be connected to PN #2 of the service provider. Therefore, User A can receive a service from PN #2 through an arbitrary device of PN #1.

The embodiments of the present invention described above can be combined. Therefore, each embodiment may be implemented in combination with other embodiments rather than it is implemented alone. Those skilled in the art can easily practice the combination of embodiments of the present invention, which will not be described in detail. Even though the combination of embodiments of the present invention is not described, it is not excluded from the present invention and should be interpreted as included in the scope of the present invention.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

For example, the methods of the present invention can be stored in a storage medium (e.g. an internal memory, a flash memory, a hard disk, etc.) and can be implemented into codes or commands in a software program executed by a processor (e.g. a microprocessor). This will be described with reference to FIG. 13.

Figure 14:
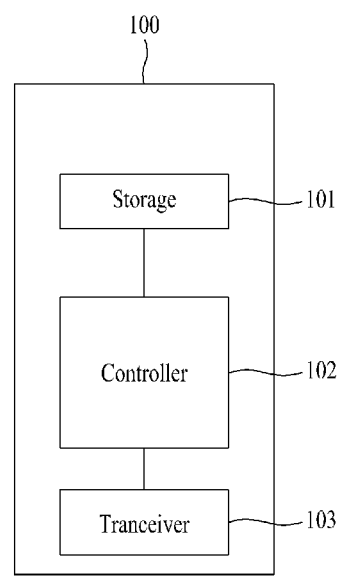
FIG. 14 is a block diagram of a device according to embodiments of the present invention.

FIG. 14 is a block diagram of a device according to embodiments of the present invention.

Referring to FIG. 14, a device 100 includes a memory 101, a controller 102, and a transceiver 103.

The memory 101 stores the methods illustrated in FIGS. 2 to 13.

The controller 102 controls the memory 101 and the transceiver 103. Specifically, the controller 102 performs the methods stored in the memory 101 and transmits the aforedescribed signals through the transceiver 103.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for communicating with another device at a communication device having a Converged Personal Network Service (CPNS)-enabled entity, the method comprising:

establishing a connection with a first device by the CPNS-enabled entity of the communication device operating in Personal Network Entity (PNE) mode, the first device being configured as a gateway and managing a first network;

receiving a first bridge request message by the CPNS-enabled entity of the communication device, if the communication device moves into a coverage of a second network managed by a second device, the first bridge request message being generated based on a comparison between information about the first network received from the first device and information about devices detected during a discovery procedure between the communication device and the second device;

transmitting a bridge request message to the first device in response to the received bridge request message;

receiving a bridge response message including a value indicating allowance or denial from the first device; and activating a bridge function based on the value included in the bridge response message, wherein, if the first device cannot communicate with the second device and there is an entity in the first network that should receive a service from the second network, the bridge response message includes a value indicating allowance.

2. The method of claim 1, further comprising transmitting a bridge response message including a value indicating allowance or denial to the second device.

3. The method of claim 1, wherein, if the first device receives an acknowledgement from a user, the bridge response message includes the value indicating allowance.

4. The method of claim 1, wherein communication links are established among the communication device of the first network, the first device, and the second device of the second network, by the bridge activation.

5. The method of claim 1, further comprising:
establishing a physical connection with the second device after the communication device moves into the coverage of the second network managed by the second device; and
performing a discovery procedure with the second device after the physical connection is established.

6. The method of claim 5, wherein a message including information about the first network is transmitted to the second device during the discovery procedure.

7. The method of claim 1, wherein the comparison is performed by the second device or a CPNS server.

8. A method for communicating with another device at a communication device having a Converged Personal Network Service (CPNS)-enabled entity, the method comprising:
establishing a first network with a first device operating as a Personal Network Entity (PNE) by the CPNS-enabled entity of the communication device operating in gateway mode, the CPNS-enabled entity of the communication device managing the first network, the first network including one or more PNEs capable of receiving a first service through the CPNS-enabled entity configured as a gateway;
receiving a bridge request message from the first device, the bridge request message being generated by a second device when the first device moves into a coverage of a second network managed by the second device; and
transmitting a bridge response message including a value indicating allowance to the first device to activate the first device as a bridge, if the first device cannot communicate with the second device and there is an entity in the first network that should receive a service from the second network,
wherein communication links are established among the communication device, the first device, and the second device by the bridge activation.

9. The method of claim 8, wherein, if the first device receives an acknowledgement from a user, the bridge response message includes a value indicating allowance.

10. The method of claim 8, wherein the bridge request message is generated by the second device based on a comparison between information about the first network and information about devices detected during a discovery procedure between the first and second devices.

11. A communication device comprising:
a storage for storing a Converged Personal Network Service (CPNS)-enabled entity set to Personal Network Entity (PNE) mode;
a transceiver for, when the communication device moves into a coverage of a second network managed by a second device while being connected to a first device having a CPNS-enabled entity configured as a gateway, upon receipt of a first bridge request message from the second device, transmitting a second bridge request message to the first device and receiving a bridge response message including a value indicating allowance or denial from the first device, the first device managing the first network and the first network including one or more PNEs capable of receiving a first service through the first device; and
a controller for activating a bridge function based on the value included in the bridge response message, the bridge function allowing communication between the first and second networks,
wherein if the first device cannot communicate with the second device and there is an entity in the first network that should receive a service from the second network, the bridge response message includes a value indicating allowance.

12. The communication device of claim 10, wherein the transceiver transmits a bridge response message including a value indicating allowance or denial to the second device.

13. The communication device of claim 11, wherein, if the first device receives an acknowledgement from a user, the bridge response message includes a value indicating allowance.

14. The communication device of claim 11, wherein, after the communication device moves into the coverage of the second network managed by the second device, the transceiver establishes a physical connection with the second device and then performs a discovery procedure with the second device.

15. The communication device of claim 14, wherein the transceiver transmits a message including information about the first network to the second device during the discovery procedure.

* * * * *